United States Patent
Okasaka et al.

(10) Patent No.: US 10,072,647 B2
(45) Date of Patent: Sep. 11, 2018

(54) COMPRESSOR, COMPRESSOR HOUSING, AND METHOD FOR MANUFACTURING COMPRESSOR HOUSING

(71) Applicant: SUMITOMO BAKELITE CO., LTD., Tokyo (JP)

(72) Inventors: Shu Okasaka, Tokyo (JP); Shinya Yamamoto, Tokyo (JP)

(73) Assignee: SUMITOMO BAKELITE COMPANY LIMITED, Tokyo (JP)

( * ) Notice: Subject to any disclaimer, the term of this patent is extended or adjusted under 35 U.S.C. 154(b) by 201 days.

(21) Appl. No.: 15/303,844

(22) PCT Filed: Apr. 1, 2015

(86) PCT No.: PCT/JP2015/060323
§ 371 (c)(1),
(2) Date: Oct. 13, 2016

(87) PCT Pub. No.: WO2015/159713
PCT Pub. Date: Oct. 22, 2015

(65) Prior Publication Data
US 2017/0030343 A1  Feb. 2, 2017

(30) Foreign Application Priority Data
Apr. 16, 2014 (JP) .................. 2014-084325

(51) Int. Cl.
*B29C 45/14* (2006.01)
*F04B 27/10* (2006.01)
(Continued)

(52) U.S. Cl.
CPC .......... *F04B 27/1081* (2013.01); *B29C 45/14* (2013.01); *B29C 45/14008* (2013.01);
(Continued)

(58) Field of Classification Search
CPC .. F04B 27/1081; F04B 27/1045; F04B 39/00; F04B 39/12; B29C 45/15; B29C 45/14008; B29L 2101/10
(Continued)

(56) References Cited

U.S. PATENT DOCUMENTS 4,304,533 A    12/1981  Buckell
8,636,936 B2 *  1/2014  Modin ................. B29C 70/545
                                           264/273

(Continued)

FOREIGN PATENT DOCUMENTS

GB    1602568 A    11/1981
JP    1-106697 U   7/1989
(Continued)

OTHER PUBLICATIONS

International Search Report dated Jun. 23, 2015, issued in counterpart International Application No. PCT/JP2015/060323 (2 pages).

*Primary Examiner* — Thomas E Lazo
*Assistant Examiner* — Daniel Collins
(74) *Attorney, Agent, or Firm* — Westerman, Hattori, Daniels & Adrian, LLP

(57) ABSTRACT

A housing (10) of a compressor (1) according to the present embodiment includes at least one compression chamber (101) that compresses a gas aspirated into the inside thereof and is composed of a metal-resin composite (16) in which a resin member (14) composed of a thermosetting resin composition and a metal member (12) are bonded to each other. In a case where the metal-resin composite (16) is made into a test piece in which the resin member (14) having a thickness $d_1$ and the metal member (12) having a thickness $d_2$ are laminated on and bonded to each other and a ratio of $d_1/d_2$ is 3, and the test piece is put in a first state where the test piece is disposed, the surface on the resin member (14)-exposed side up, on two supports with no stress applied (Continued)

thereto and a second state where a 1-point bending stress of 140 MPa is applied in a thickness direction to the center of the surface on the resin member (14) side such that the center caves in after the first state, when putting in the first and second states is alternately repeated 1,000,000 times at a frequency of 30 Hz under a temperature condition of 25° C., the metal-resin composite exhibits bending fatigue resistance in which neither peeling nor fracture occurs.

15 Claims, 5 Drawing Sheets

(51) Int. Cl.
  *B32B 15/08* (2006.01)
  *F04B 39/00* (2006.01)
  *F04B 39/12* (2006.01)
  *B29K 101/10* (2006.01)

(52) U.S. Cl.
  CPC .......... *B32B 15/08* (2013.01); *F04B 27/1045* (2013.01); *F04B 27/1054* (2013.01); *F04B 39/00* (2013.01); *F04B 39/12* (2013.01); *B29K 2101/10* (2013.01); *F04B 39/121* (2013.01)

(58) Field of Classification Search
  USPC .......................................... 264/259; 92/169.1
  See application file for complete search history.

(56) References Cited

U.S. PATENT DOCUMENTS

| | | |
|---|---|---|
| 2003/0017440 A1 | 1/2003 | Bergey et al. |
| 2005/0074348 A1 | 4/2005 | Maeda et al. |
| 2011/0239857 A1* | 10/2011 | Iyatani .................. B60T 8/4031 92/163 |
| 2013/0071654 A1 | 3/2013 | Mase |

FOREIGN PATENT DOCUMENTS

| | | |
|---|---|---|
| JP | 2-1482 U | 1/1990 |
| JP | 2-86431 A | 3/1990 |
| JP | 4-19373 A | 1/1992 |
| JP | 2004-196926 A | 7/2004 |
| JP | 2005-113880 A1 | 4/2005 |
| JP | 2008-126417 A | 6/2008 |
| JP | 2013-25902 A | 2/2013 |
| JP | 2013-63513 A | 4/2013 |

* cited by examiner

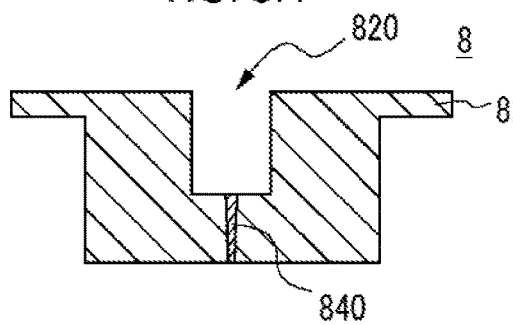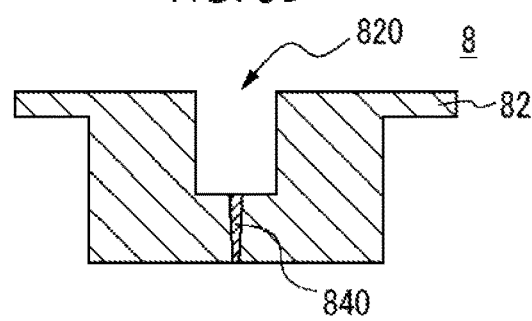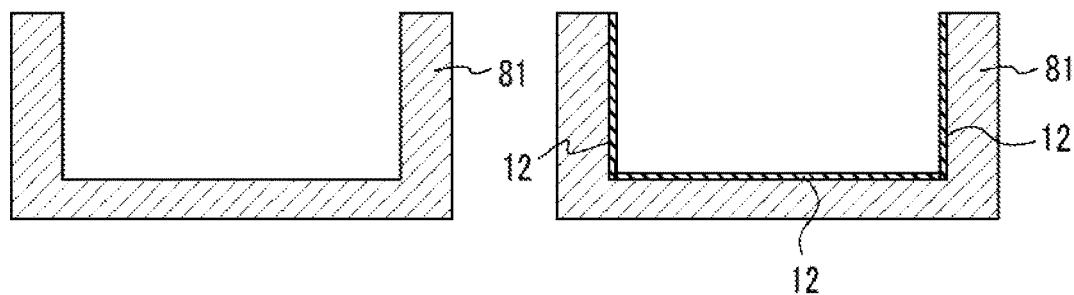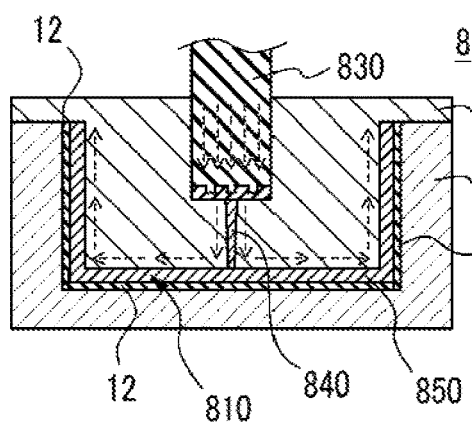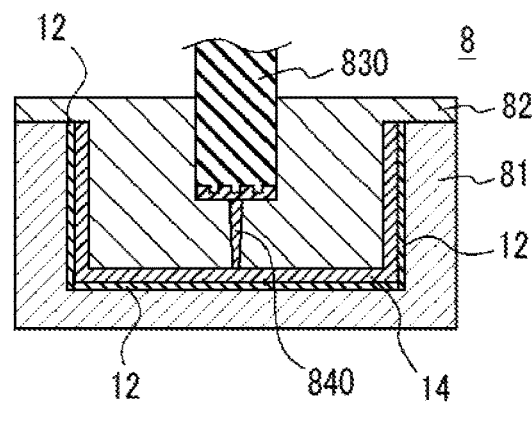

COMPRESSOR, COMPRESSOR HOUSING, AND METHOD FOR MANUFACTURING COMPRESSOR HOUSING

TECHNICAL FIELD

The present invention relates to a compressor, a compressor housing, and a method for manufacturing a compressor housing.

BACKGROUND ART

Low-energy consumption vehicles are in demand, and there is a method for saving energy that reduces the weight of parts mounted on vehicles.

Patent Document 1 discloses a pressure-resistant vessel made of a resin. Although the pressure-resistant vessel made of a resin is lightweight, it has a problem with gas barrier properties. Patent Document 1 describes a technique for improving gas barrier properties by forming a metal film on the surface of the vessel through plating or the like. However, according to investigation conducted by the inventor of the present invention, in a case where such a technique for a pressure-resistant vessel made of a resin was applied to a housing of an air conditioner compressor for vehicles, sufficient durability was not obtained. As a result of further conducting investigation regarding the cause, the inventor newly found that, due to the repeated stress resulting from the operation of the compressor, interfacial peeling occurs between a metal and a resin, and hence the resistance becomes insufficient.

RELATED DOCUMENT

Patent Document

[Patent Document 1] Japanese Unexamined Patent Publication No. 2004-196926

SUMMARY OF THE INVENTION

The present invention provides a compressor housing in which performances including lightweight properties and high resistance are excellently balanced.

According to the present invention, there is provided a compressor housing composed of a metal-resin composite in which a resin member composed of a thermosetting resin composition and a metal member are bonded to each other, the compressor housing including at least one compression chamber that compresses a gas aspirated into the inside thereof, in which in a case where the metal-resin composite is made into a test piece in which the resin member having a thickness $d_1$ and the metal member having a thickness $d_2$ are laminated on and bonded to each other and a ratio of $d_1/d_2$ is 3, and the test piece is put in a first state where the test piece is disposed, the surface on the resin member-exposed side up, on two supports with no stress applied thereto and a second state where a 1-point bending stress of 140 MPa is applied in a thickness direction to the center of the surface on the resin member side such that the center caves in after the first state, when putting in the first and second states is alternately repeated 1,000,000 times at a frequency of 30 Hz under a temperature condition of 25° C., the metal-resin composite exhibits bending fatigue resistance in which neither peeling nor fracture occurs.

According to the present invention, there is provided a compressor including the compressor housing.

According to the present invention, there is provided a method for manufacturing a compressor housing, including a step of preparing a metal member and a mold, a step of disposing the metal member in a molding space of the mold, a step of filling the molding space with a fluidized resin material containing a thermosetting resin, and a step of obtaining a housing composed of a metal-resin composite in which a resin member and the metal member are bonded to each other by curing the resin material filling the molding space in this order, in which in a case where the metal-resin composite is made into a test piece in which the resin member having a thickness $d_1$ and the metal member having a thickness $d_2$ are laminated on and bonded to each other and a ratio of $d_1/d_2$ is 3, and the test piece is put in a first state where the test piece is disposed, the surface on the resin member-exposed side up, on two supports with no stress applied thereto and a second state where a 1-point bending stress of 140 MPa is applied in a thickness direction to the center of the surface on the resin member side such that the center caves in after the first state, when putting in the first and second states is alternately repeated 1,000,000 times at a frequency of 30 Hz under a temperature condition of 25° C., the metal-resin composite exhibits bending fatigue resistance in which neither peeling nor fracture occurs.

According to the present invention, it is possible to provide a compressor housing in which performances including lightweight properties and high resistance are excellently balanced.

BRIEF DESCRIPTION OF THE DRAWINGS

The aforementioned object, and other objects, characteristics, and advantages will be further clarified by the following preferred embodiments and the following drawings attached thereto.

FIGS. 5A to 5D are views for illustrating an example of a method for manufacturing a housing according to an embodiment.

DESCRIPTION OF EMBODIMENTS

Figure 1:
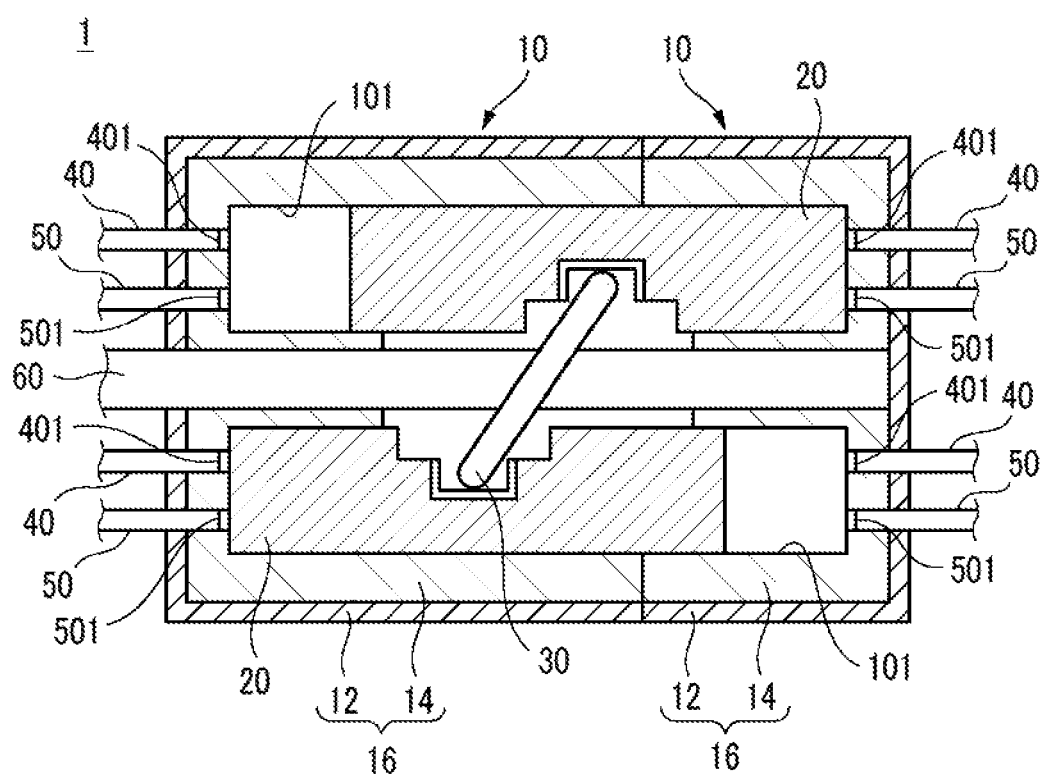
FIG. 1 is a schematic view for illustrating a compressor housing according to an embodiment.

Hereinafter, embodiments of the present invention will be described using drawings. In all of the drawings, the same constituents will be denoted by the same reference numerals, and the description will not be repeated as appropriate.

FIG. 1 is a view for illustrating a housing 10 of a compressor 1 according to an embodiment. FIG. 1 is a sectional view schematically showing an example of the structure of the compressor 1.

The housing 10 of the compressor 1 according to the present embodiment includes at least one compression chamber 101 that compresses a gas aspirated into the inside thereof, and is composed of a metal-resin composite 16 in which a resin member 14 composed of a thermosetting resin composition and a metal member 12 are bonded to each other. In a case where the metal-resin composite 16 is made into a test piece in which the resin member 14 having a thickness of $d_1$ and the metal member 12 having a thickness of $d_2$ are laminated on and bonded to each other and a ratio of $d_1/d_2$ is 3, and the test piece is put in a first a state where it is disposed, the surface on the resin member 14 exposed side up, on two supports under a temperature condition of 25° C. with no stress applied thereto and a second state where a 1-point bending stress of 140 MPa is applied in a thickness direction to the center of the resin member 14 side such that the center caves in after the first state, when putting in the first and second states is alternately repeated 1,000,000 times at a frequency of 30 Hz, the metal-resin composite exhibits bending fatigue resistance in which neither peeling not fracture occurs.

<Compressor and Housing>

First, the structure of the compressor 1 will be described. In the present embodiment, a case where the compressor 1 is a swash plate-type compressor and the housing 10 is a housing thereof will be described. The compressor 1 aspirates a low-temperature low-pressure gas into a cylinder (compression chamber) 101, compresses the aspirated gas inside the cylinder 101 by using a piston 20 so as to change the gas into a high-temperature high-pressure gas, and then discharges the gas. The gas is, for example, a refrigerant gas. The compressor 1 according to the present embodiment includes the housing 10, the piston 20, a swash plate 30, an aspiration pipe 40, a discharge pipe 50, and a shaft 60. The shaft 60 in inserted into the housing 10, and the swash plate 30 is obliquely fixed to the shaft 60. The shaft 60 is connected to a motor or an engine not shown in the drawing and can rotate relative to the housing 10. A plurality of pistons 20 is provided in the housing 10, and the cylinder 101 is formed at both ends of each piston 20. The cylinder 101 is a cylindrical system, and the piston 20 can reciprocate in the cylinder 101. A gas is aspirated into a space formed by the cylinder 101 and the tip of the piston 20 and compressed by the piston 20. The rotation axis of the shaft 60 and the major axis of the cylinder 101 are in parallel with each other. The swash plate 30 is mounted such that it can rotate in each piston 20 in the vicinity of the outer peripheral portion thereof.

Each cylinder 101 is connected to the aspiration pipe 40 and the discharge pipe 50. In the connection port between the aspiration pipe 40 and the cylinder 101, an aspiration valve 401 is provided, and in the connection portion between the discharge pipe 50 and the cylinder 101, a discharge valve 501 is provided.

The compressor 1 includes the housing 10 composed of the metal-resin composite 16. The compressor 1 according to the present embodiment includes two housings 10, and the two housings 10 are connected to each other through a plurality of bolts not shown in the drawing. The housings 10 according to the present embodiment are both composed of the metal-resin composite 16 having the metal member 12 and the resin member 14. However, the present invention is not limited thereto, and the compressor 1 may be constituted with a housing solely composed of, for example, a metal. The way the metal member 12 and the resin member 14 are disposed in the housing 10 according to the present embodiment is not particularly limited. From the viewpoint of improving strength and sealing properties within the housing 10, portion forming the outermost surface of the compressor 1 is preferably composed of the metal member 12. Furthermore, in order to improve sliding properties of the piston 20 in the cylinder 101, the resin member 14 is preferably exposed as the inner wall of the cylinder 101 the housing 10, and within the inner wall of the cylinder 101, at least a portion on which the piston 20 slides is preferably composed of the resin member 14. The inner wall of the cylinder 101 may be totally composed of the resin member 14. From the viewpoint of weight lightening, 50% by volume or more of the housing 10 is preferably composed of the resin member 14.

When a bending stress of 140 MPa is repeatedly applied 1,000,000 times to the metal-resin composite 16 by means of pulsating three-point bending at 25° C., the metal-resin composite 16 exhibits bending fatigue resistance in which neither peeling nor fracture occurs. The method for evaluating the fatigue resistance will be specifically described later. Because the metal-resin composite 16 has the bending fatigue resistance described above, a compressor 1 having excellent durability can be obtained. The method for manufacturing the housing 10 will be described later.

Next, the operation of the compressor 1 will be described. The shaft 60 rotates due to the driving of a motor or an engine. Due to the rotation of the shaft 60, the swash plate 30 fixed to the shaft 60 rotates. The swash plate 30 is obliquely fixed to the shaft 60. Accordingly, by performing rotation, the swash plate 30 applies a force acting on the major axis direction (horizontal direction in FIG. 1) of the cylinder 101 to each piston 20 and makes the piston reciprocate. The piston 20 then compresses the gas in the cylinder 101. While the shaft 60 is rotating once, the piston 20 reciprocates once.

The refrigerant gas is supplied into the cylinder 101 connected to the aspiration pipe 40 from the outside of the housing 10 through the aspiration pipe 40. Then, the refrigerant gas compressed by the piston 20 is discharged outside the housing 10 through the discharge pipe 50. Specifically, when the piston 20 moves such that the space in the cylinder 101 connected to the aspiration pipe 40 widens, the internal pressure of the space is reduced, the aspiration valve 401 is opened, the low-temperature low-pressure refrigerant gas is introduced into the space from the aspiration pipe 40, and the space is filled with the refrigerant gas. At this time, the discharge valve 501 remains closed. Inversely, when the piston 20 moves such that the space is narrowed, the refrigerant gas is compressed and becomes a high-temperature and high-pressure gas. When the internal pressure of the space is increased and becomes equal to or higher than a predetermined pressure, the discharge valve 501 is opened, and the high-temperature and high-pressure refrigerant gas is discharged through the discharge pipe 50.

The compressor 1 is used as for example, a compressor for a car air conditioner mounted on vehicles, but the compressor 1 is not limited thereto. The compressor 1 may be used in air conditioners not being mounted on vehicles and may be used in applications other than air conditioners, such as a freezing machine, an air compressor, an atomizer, and supercharger.

In the present embodiment, a case where the compressor 1 is a swash plate-type compressor is described. However, the compressor 1 may be other types of compressor such as a crank-type, a waffle-type, a scroll-type, or a vane-type compressor.

Next, the housing 10 according to the present embodiment will be described. In a case where the metal-resin composite 16 constituting the housing 10 is made into a test piece in which the resin member 14 having a thickness of $d_1$ and the metal member 12 having a thickness of $d_2$ are laminated or and bonded to each other and a ratio of $d_1/d_2$ is 3, and the test piece is put in a first state where the test piece is disposed, the surface on the resin member 14 side up, on two supports with no stress applied thereto and a second state where 1-point bending stress of 140 MPa is applied in a thickness direction to the center of the resin member 14 side such that the center caves in after the first state, when putting in the first and second states is alternately repeated 1,000,000 times at a frequency of 30 Hz under a temperature condition of 25° C., the metal-resin composite 16 exhibits bending fatigue resistance in which neither peeling nor fracture occurs. Hereinafter, the bending fatigue resistance described above will be referred to as "1,000,000-time bending fatigue resistance".

Whether or not the metal-resin composite 16 has 1,000,000-time bending fatigue resistance can be evaluated by repeatedly applying bending stress to the test piece composed of the metal-resin composite 16. The evaluation method will be specifically described below.

Figure 2:
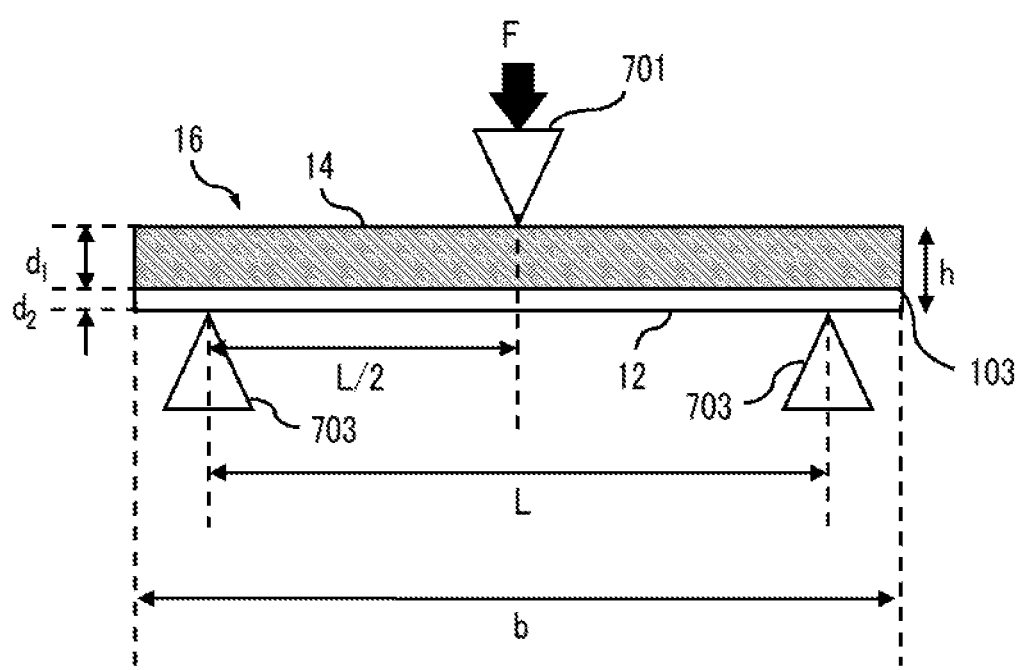
FIG. 2 is a schematic view for illustrating a method for evaluating 1,000,000-time bending fatigue resistance.

FIG. 2 is a view for illustrating a method for evaluating 1,000,000-time bending fatigue resistance. First, a rectangular test piece composed of the metal-resin composite 16 is prepared. In the test piece, there is one bonding surface 103 between the metal member 12 and the resin member 14, and the thickness or the resin member 14 is three times the thickness of the metal member 12 ($d_1/d_2=3$). As long as $d_1/d_2$ is 3, a thickness h, a width b, and a depth of the test piece are not limited. The thickness h of the test piece is preferably 4.0±0.2 mm, the width b is preferably 80.0±2.0 mm, and the depth is preferably 10.0±0.2 mm. In the test piece, the bonding surface 103 between the metal member 12 and the resin member 14 is orthogonal to the thickness direction. The test piece can be prepared by being cut off from the housing 10, for example.

The prepared test piece is disposed on two supports 703 (first state). The distance between the two supports 703 is regulated in advance such that the prepared test piece can be placed thereon. The two supports are disposed to establish bilateral symmetry with respect to the test piece. At this time, the test piece is disposed, the surface on the metal member 12 side down, so as to contacts the supports 703. Then, an indenter 701 is brought into contact with the surface of the resin member 14 on the opposite side, and a pulsating bending stress of 140 MPa is repeatedly applied in a direction perpendicular to the bonding surface 103. The indenter 701 and the test piece contact each other in a position that is away from each of contact positions (supporting points) between each of the two supports 703 and the test piece by the same distance. The repeated application of stress is performed in an atmosphere at 25° C.

The magnitude $\sigma$ [MPa] of the bending stress is expressed as $\sigma=3 FL/2 bh^2$. Herein, F [N] is a force applied from the indenter 701 (unit: N), L is a distance between supporting points (unit: mm), b is a width of the test piece (unit: mm), and h is a thickness of the test piece (unit: mm). According to the width and thickness of the test piece and the distance between supporting points, the force F is determined such that the magnitude of the bending stress becomes 140 MPa, and the stress is repeatedly applied. In this way, the 1,000,000-time bending fatigue resistance can be evaluated.

As a result of applying a stress of 140 MPa in the manner described above, the test piece bends slightly such that the center thereof caves in (second state). The application of stress is then stopped, and the test piece reverts to the first state where no stress is applied. The first state and the second state are alternately repeated 1,000,000 times at a frequency of 30 Hz. After the application of stress is repeated 1,000,000 times, the test piece is observed to check whether peeling or fracture occurs. In a case where neither peeling nor fracture occurs, the test piece is evaluated to have 1,000,000-time bending fatigue resistance.

For example, for the metal-resin composite 16 according to the present embodiment, by setting the distance L between supporting points to be 64 mm, the width b of the test piece to be 80 mm, the depth to be 10 mm, the height h to be 4.0 mm (thickness of the metal member 12: 1.0 mm, thickness of the resin member 14: 3.0 mm), and the force F to be 1.87 kN and applying a bending stress of 140 MPa, whether the metal-resin composite 16 has 1,000,000-time bending fatigue resistance can be checked. However, as described above, the present invention is not limited to the aforementioned conditions.

Hereinafter, examples of the structure of the bonding surface 103 or the like of the metal-resin composite 16 having 1,000,000-time bonding fatigue resistance and the method for manufacturing the metal-resin composite 16 will be described. However, the present invention is not limited thereto as long as the metal-resin composite 16 constituting the housing 10 has 1,000,000-time bending fatigue resistance.

<Metal Member>

Figure 3:
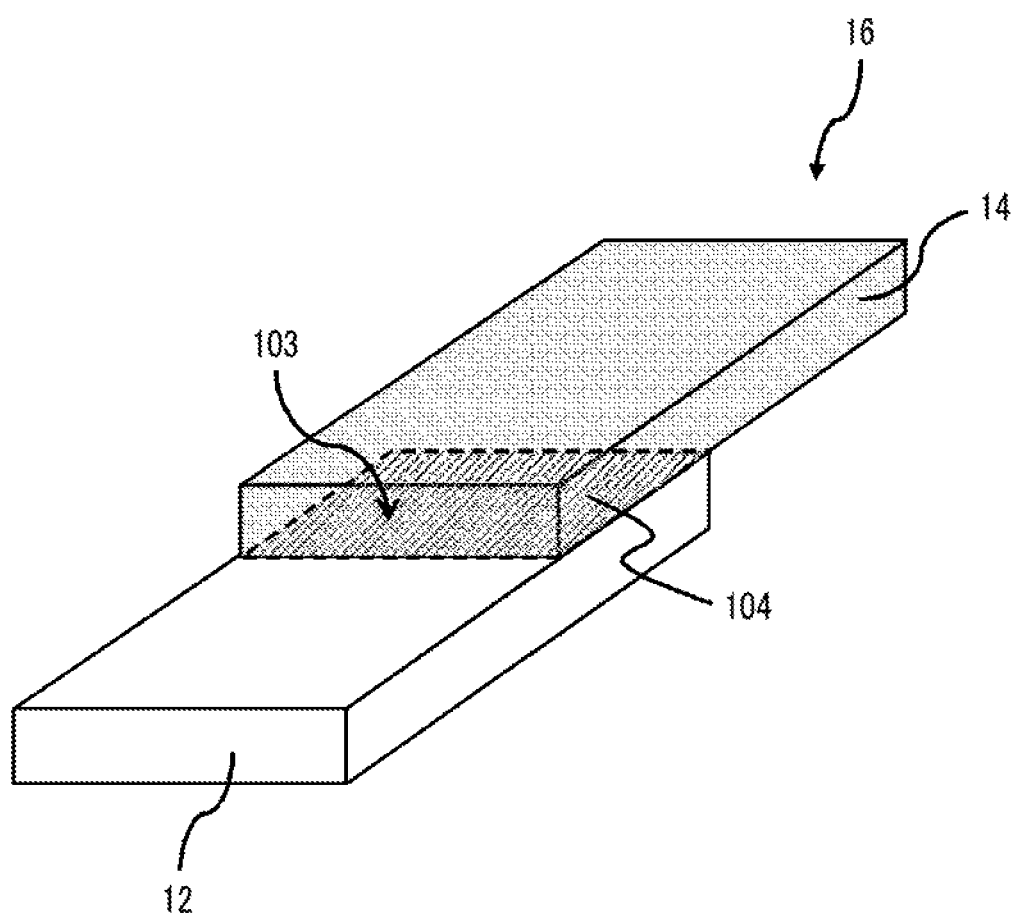
FIG. 3 is a view for illustrating a metal-resin composite according to an embodiment.

FIG. 3 is a view for illustrating the metal-resin composite 16 according to the present embodiment. FIG. 3 is a model view for illustrating particularly the bonding surface 103 between the metal member 12 and the resin member 14 in the metal-resin composite 16, and is not a view exactly showing the structure of the housing 10 entirely or partially. FIG. 3 is a perspective view showing schematically showing an example of a molded article of the metal-resin composite 16 constituting the housing 10.

The metal material constituting the metal member 12 is not particularly limited. From the viewpoint of ease of availability or costs, examples of the metal material include iron, stainless steel, aluminum, an aluminum alloy, magnesium, a magnesium alloy, copper, a copper alloy, and the like. One kind of these may be used singly, or two or more kinds thereof may be used in combination. Among these, aluminum and an aluminum alloy are preferable because these are lightweight and have high strength. From the viewpoint of improving the bond strength between the resin member 14 and the metal member 12, the metal member 12 preferably has a roughened layer 104 including fine irregularities within the bonding surface 103 between the metal member 12 and the resin member 14.

Figure 4:
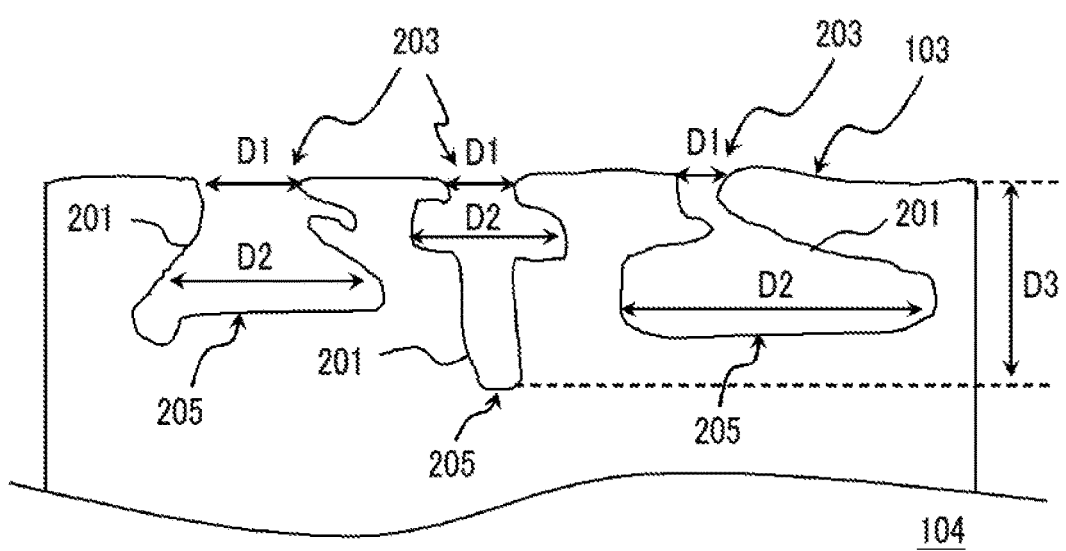
FIG. 4 is a schematic view for illustrating an example of sectional shapes of depression portions constituting a roughened layer of the surface of a metal member according to an embodiment.

FIG. 4 is a schematic view for illustrating an example of sectional shapes of depression portions 201 constituting the roughened layer 104 on the surface of the metal member 12 according to the present embodiment. The roughened layer 104 refers to a region having a plurality of depression portions 201 provided on the surface of the metal member 12.

The thickness of the roughened layer 104 is preferably equal to or greater than 3 μm and equal to or less than 40 μm, more preferably equal to or greater than 4 μm and equal to or less than 32 μm, and particularly preferably equal to or greater than 4 μm and equal to or less than 30 μm. If the thickness of the roughened layer 104 is within the above range, the bond strength between the resin member 14 and the metal member 12 and the durability of bonding can be further improved. In the present embodiment, the thickness of the roughened layer 104 refers to a depth D3 of a depression portion having the greatest depth among a plurality of depression portions 201, and can be calculated from an image of a scanning electron microscope (SEM).

It is preferable that each depression portion 201 has such a sectional shape that, between an opening portion 203 and a bottom portion 205 of the depression portion 201, there is at least a portion whose section width D2 is greater than a section width D1 of the opening portion 203.

As shown in FIG. 4 the sectional shape of the depression portion 201 is not particularly limited as long as D2 is greater than D1, and various shapes can be adopted. The sectional shape of the depression portion 201 can observed with, for example, a scanning electron microscope (SEM).

It is unclear why the metal-resin composite 16 in which the bond strength is further improved is obtained if the depression portion 201 has the aforementioned sectional shape. Presumably, this is because the bonding surface 103 has a surface structure by which the anchor effect between the resin member 14 and the metal member 12 can be more strongly exhibited.

If the depression portion 201 has the aforementioned sectional shape, the resin member 14 is entangled in the depression portion 201 throughout the opening portion 203 and the bottom portion 205, and thus the anchor effect is effectively exerted. It is considered that, for this reason, the bond strength between the resin member 14 and the metal member 12 and the durability of bonding are improved.

The average depth the depression portion 201 is preferably equal to or greater than 0.5 μm and equal to or less than 40 μm, and more preferably equal to or greater than 1 μm and equal or less than 30 μm. If the average depth of the depression portions 201 is equal to or less than the upper limit described above, a thermosetting resin composition (P) can sufficiently permeate deep into the depression portion 201, and hence the mechanical strength of the region, in which the resin member 14 and the metal member 12 permeate to each other, and the durability of bonding can be further improved. If the average depth of the depression portions 201 is equal to or greater than the lower limit described above, in a case where the thermosetting resin composition (P) contains a finer (B), a ratio of the filler (B) present in the depression portions 201 can be increased, and hence the mechanical strength of the region, in which the resin member 14 and the metal member 12 permeate to each other, and the durability of bonding can be further improved. Consequently, if the average depth of the depression portions 201 is within the above range, the bond strength between the resin member 14 and the metal member 12 and the durability of bonding can be further improved.

The average depth of the depression portions 201 can be measured using an image of a scanning electron microscope (SEM) as below, for example. First, a section of the roughened layer 104 is imaged by a scanning electron microscope. From the image observed, 50 depression portions 201 are randomly selected, and the depth of each of them is measured. Then, all of the depths of the depression portions 201 are added up and divided by 50, thereby obtaining the average depth.

The surface roughness Ra of the bonding surface 103 of the metal member 12 is preferably equal to our greater than 0.5 μm and equal to or less than 40.0 μm, more preferably equal to or greater than 1.0 μm and equal to or less than 20.0 μm, and particularly preferably equal to or greater than 1.0 μm and equal to or less than 10.0 μm. If the surface roughness Ra is within the above range, the bond strength between the resin member 14 and the metal member 12 can be further improved.

The maximum height Rz of the bonding surface 103 of the metal member 12 is preferably equal to or greater than 1.0 μm and equal to or less than 40.0 μm, and more preferably equal to or greater than 3.0 μm and equal to or less than 30.0 μm. If the maximum height Rz is within the above range, the bond strength between the resin member 14 and the metal member 12 and the durability of bonding can be further improved. Ra and Rz can be measured based on JIS-B0601.

The ratio of an actual surface area (hereinafter, simply referred to as a specific surface area as well), which is measured by a nitrogen adsorption BET method, of the metal member 12 to an apparent surface area of the bonding surface 103 bonded to at least the resin member 14 is preferably equal to or greater than 100, and more preferably equal to or greater than 150. If the specific surface area is equal to or greater than the lower limit described above, the bond strength between the resin member 14 and the metal member 12 and the durability of bonding can be further improved. The specific surface area is preferably equal to or less than 400, more preferably equal to or less than 380, and particularly preferably equal to or less than 300. If the specific surface area is equal to or less than the upper limit described above, the bond strength between the resin member 14 and the metal member 12 and the durability of bonding can be further improved.

In the present embodiment, the apparent surface area means a surface area determined on the assumption that the surface of the metal member 12 has a smooth surface shape free of irregularities. For example, in a case where the surface shape is rectangular, the apparent surface area is represented by width×length. In contrast, in the present embodiment, the actual surface area determined by a nitrogen adsorption BET method means a BET surface area determined by an adsorption amount of nitrogen gas. For example, for a vacuum-dried sample for measurement, an adsorption and desorption amount of nitrogen at the temperature of liquid nitrogen is measured using an automatic specific surface area/pore distribution analyzer (BELSORP-mini II manufactured by BEL Japan, Inc.), and based on the adsorption and desorption amount of nitrogen, the actual surface area can be calculated.

It is unclear why the metal-resin composite 16 in which the bond strength and the durability of bonding are further improved is obtained if the specific surface area is within the above range. Presumably, this is because the bonding surface 103 bonded to the resin member 14 has a surface structure by which the anchor effect between the resin member 14 and the metal member 12 can be more strongly exhibited.

If the specific surface area is equal to or greater than the lower limit described above, the contact area between the resin member 14 and the metal member 12 is enlarged, and thus the number of regions in which the resin member 14 and the metal member 12 permeate to each other is increased. It is considered that, as a result, the number of regions in which the anchor effect is exerted is increased, and hence the bond strength between the resin member 14 and the metal member 12 and the durability of bonding are further improved.

In contrast, if the specific surface area is too large, in the region in which the resin member 14 and the metal member 12 permeate to each other, the proportion of the metal member 12 is reduced, and hence the mechanical strength of the region and the durability of bonding are decreased. Accordingly, it is considered that if the specific surface area is equal to or less than the upper limit described above, the mechanical strength of the region, in which the resin member 14 and the metal member 12 permeate to each other, and the durability of bonding are further improved, and hence the bond strength between the resin member 14 and the metal member 12 and the durability of bonding can be further improved.

For the above reasons, it is assumed that, if the specific surface area is within the above range, the bonding surface 103 bonded to the resin member 14 has an excellently balanced surface structure by which the anchor effect between the resin member 14 and the metal member 12 are more strongly exhibited.

The metal member 12 is not particularly limited. A degree of glossiness of at least the bonding surface 103 to be bonded to the resin member 14 is preferably equal to or greater than 0.1, more preferably equal to or greater than 0.5, and even more preferably equal to or greater than 1. If the degree of glossiness is equal to or greater than the lower limit described above, the bond strength between the resin member 14 and the metal member 12 can be further improved. The degree of glossiness is preferably equal to or less than 30, and more preferably equal to or less than 20. If the degree of glossiness is equal to or less than the upper limit described above, the bond strength between the resin member 14 and the metal member 12 can be further improved. In the present embodiment, the degree of glossiness refers to a value measured based on ASTM-D523 at a measurement angle of 60° (incidence angle: 60°, reflection angle: 60°). The degree of glossiness can be measured using a digital gloss meter (20°, 60°) (GM-26 model, manufactured by MURAKAMI COLOR RESEARCH LABORATORY CO., Ltd.), for example.

It is unclear why the metal-resin composite 16 in which the bond strength is further improved is obtained if the degree of glossiness is within the above range. Presumably, this is because the bonding surface 103 bonded to the resin member 14 has a more complicated surface structure by which the anchor effect between the resin member 14 and the metal member 12 can be more strongly exhibited.

The shape of the metal member 12 is not particularly limited as long as it has the bonding surface 103 to be bonded to the resin member 14. For example, the metal member 12 can have a sheet shape, a flat plate shape, a curved plate shape, a rod shape, a cylindrical shape, a lump shape, and the like. Furthermore, the metal member 12 may be a structure having these shapes in combination. The metal member 12 having the above shape can be obtained by processing the aforementioned metal material by a known processing method.

The shape of the bonding surface 103 to be bonded to the resin member 14 is not particularly limited, and examples thereof include flat surface, a curved surface, and the like.

Next, the method for forming the roughed layer 104 by performing a roughening treatment on the surface of the metal member 12 will be described.

The roughened layer 104 can be formed by chemically treating the surface of the metal member 12 by using a surface treatment agent, for example.

The process of chemically treating the surface of the metal member 12 by using a surface treatment agent has also been carried out in the related art. However, in the present embodiment, factors such as (1) the combination of the metal member and the surface treatment agent, (2) the temperature and time of the chemical treatment, and (3) the post-treatment for the surface of the metal member having undergone the chemical treatment are highly controlled. In order to obtain the metal-resin composite 16 having 1,000,000-time bending fatigue resistance, it is particularly important to highly control these factors.

An example of the method for forming the roughened layer 104 on the surface of the metal member 12 will be described below, but the method for forming the roughened layer 104 according to the present embodiment is not limited to the following example.

First, (1) the combination of the metal member and the surface treatment agent is selected.

In a case where a metal member constituted with iron or stainless steel is used, as the surface treatment agent, it is preferable to select an aqueous solution obtained by combining an inorganic acid, a source of chlorine ions, a source of copper (II) ions, and a thiol-based compound as necessary.

In a case where a metal member constituted with aluminum or an aluminum alloy is used, as the surface treatment agent, it is preferable to select an aqueous solution obtained by combining a source of alkali, a source of amphoteric metal ions, a source of nitrate ions, and a thio compound as necessary.

In a case where a metal member constituted with magnesium or a magnesium alloy is used, as the surface treatment agent, a source of alkali is used, and it is particularly preferable to select an aqueous solution of sodium hydroxide.

In a case where a metal member constituted with copper or a copper alloy is used, as the surface treatment agent, it is preferable to select an aqueous solution using at least one kind of component selected from an inorganic acid such as nitric acid or sulfuric acid, an organic acid such as unsaturated carboxylic acid, persulfate, hydrogen peroxide, azoles such as imidazole and a derivative thereof, tetrazole and a derivative thereof, aminotetrazole and a derivative thereof, and aminotriazole and a derivative thereof, a pyridine derivative, triazine, a triazine derivative, alkanolamine an alkylamine derivative, polyalkylene glycol, sugar alcohol, a source of copper (II) ions, a source of chorine ions, a phosphonic acid-based chelating agent oxidant, and N,N-bis(2-hydroxyethyl)-N-cyclohexlamine.

Then, (2) the metal member is dipped into the surface treatment agent such that the surface of the metal member is chemically treated. At this time, the treatment temperature is 30° C., for example. The treatment time is appropriately determined according to the material or surface condition of the selected metal member, the type or concentration of the surface treatment agent, the treatment temperature, and the like. The treatment time is, for example, 30 seconds to 300 seconds. At this time, it is important that an etching amount in the depth direction of the metal member is preferably set to be equal to or greater than 3 μm and more preferably set to be equal to or greater than 5 μm. The etching amount in the depth direction of the metal member can be evaluated by being calculated from the weight, specific gravity, and surface area of the dissolved metal member. The etching amount in the depth direction can be adjusted by the type or concentration of the surface treatment agent, the treatment temperature, the treatment time, and the like.

In the present embodiment, by adjusting the etching amount in the depth direction, the thickness of the roughened layer 104, the average depth of the depression portions 201, Ra, Rz and the like described above can be adjusted.

Finally, (3) the surface of the metal member having undergone the chemical treatment is subjected to a post-treatment. First, the surface of the metal member is washed with water and dried. Then, the surface of the metal member having undergone the chemical treatment is treated with an aqueous nitric acid solution or the like.

By the above procedure, the metal member 12 having the roughened layer 104 according to the present embodiment can be obtained.

Resin Member

Next, the resin member 14 according to the present embodiment will be described.

The resin member 14 is obtained by curing the thermosetting resin composition (P).

The thermosetting resin composition (P) contains a thermosetting resin (A), and as the thermosetting resin (A), for example, a phenolic resin, an epoxy resin, an unsaturated polyester resin, a diallyl phthalate resin, a melamine resin, an oxetane resin, maleimide resin, an urea resin, a polyurethane resin, a silicone resin, a resin having an benzoxazine ring, or a cyanate ester resin is used. One kind of these may be used singly, or two or more kinds thereof may be used in combination.

Among these, a phenolic resin excellent in heat resistance, processability, mechanical characteristics, adhesiveness, and abrasion resistance is preferably used.

Provided that the total content of the resin member 14 is 100 parts by mass, the content of the thermosetting resin (A) is preferably equal to or greater than 15 parts by mass and equal to or less than 60 parts by mass, and more preferably equal to or greater than 25 parts by mass and equal to or less than 50 parts by mass.

Examples of the phenolic resin include a novolac-type phenolic resin such as a phenol novolac resin, a cresol novolac resin, or a bisphenol A-type novolac resin; a resol-type phenolic resin such as a methylol-type resol resin, a dimethylene ether-type resol resin, or an oil-melted resol phenolic resin melted using tung oil, linseed oil, walnut oil, or the like; an arylalkylene-type phenolic resin; and the like. One kind of these may be used singly, or two or more kinds thereof may be used in combination.

Among these, a novolac-type phenolic resin is preferable because it is excellent in ease of availability, is inexpensive, and exhibits excellent workability at the time of roll kneading.

In a case where the novolac-type phenolic resin is used as the phenolic resin, generally, hexamethylenetetramine is used as a curing agent. The hexamethylenetetramine is not particularly limited, but the amount thereof used is preferably 10 to 25 parts by mass, and more preferably 13 to 20 parts by mass, with respect to 100 parts by mass of the novolac-type phenolic resin. If the amount of the hexamethylenetetramine used is equal to or greater than the lower limit described above, the curing time at the time of molding can be shortened. If the amount of the hexamethylenetetramine used is equal to or less than the upper limit described above, the appearance of the molded article can be improved.

From the viewpoint of improving the mechanical strength of the resin member 14, the thermosetting resin composition (P) preferably contains the filler (B). Here, in the present embodiment, an elastomer (D), which will be described later, is not included in the filler (B).

Provided that the total content of the resin member 14 is 100 parts by mass, the content of the filler (B) is preferably equal to or greater than 30 parts by mass and equal to or less than 80 parts by mass, and more preferably equal to or greater than 40 parts by mass and equal to or less than 70 parts by mass. If the content of the filler (B) is within the above range, it is possible to improve the workability of the thermosetting resin composition (P) and to further improve the mechanical strength of the obtained resin member 14. As a result, it is possible to obtain a metal-resin composite 16 in which the bond strength between the resin member 14 and the metal member 12 is further improved. Furthermore, by adjusting the type or content of the filler (B), the value of a coefficient of linear expansion $\alpha_R$ of the obtained resin member 14 can be adjusted.

Examples of the filler (B) include a fibrous filler, a granular filler, a plate-like filler, and the like. The fibrous fillet is a filler having a fibrous shape. The plate-like filler is a filler having a plate-like shape. The granular filler is a filler whose shape is different from the shape of fibrous and plate-like filler including an amorphous filler.

Examples of the fibrous filler include a fibrous inorganic filler such as glass fiber, carbon fiber, asbestos fiber, metal fiber, wollastonite, attapulgite, sepiolite, rock wool, aluminum borate whiskers, potassium titanate fiber, calcium carbonate whiskers, titanium oxide whiskers, or ceramic fiber; and a fibrous organic filler such as aramid fiber, polyimide fiber, and poly(paraphenylene benzobisoxazole) fiber. One kind may be used singly, or two or more kinds thereof may be used in combination.

Example of the plate-like filler and the granular filler include talc, kaolin clay, calcium carbonate, zinc oxide, calcium silicate hydrate, mica, glass flake, glass powder, magnesium carbonate, silica, titanium oxide, alumina, aluminum hydroxide, magnesium hydroxide, barium sulfate, calcium sulfate, calcium sulfite, zinc borate, barium metaborate, aluminum borate, calcium borate, sodium borate, aluminum nitride, boron nitride, silicon nitride, those obtained by pulverizing the above fibrous fillers, and the like. One kind of these may be used singly, or two or more kinds thereof may be used in combination.

Provided that the total content of the filler (B) is 100 parts by mass, the filler (B) contains a filler (B1) whose average particle size in a weight-based particle size distribution measured by a laser diffraction and scattering-type particle size distribution analysis method is greater than 5 μm, preferably in an amount of equal to or greater than 70 parts by mass and equal to or less than 99 parts by mass, and more preferably in an amount of equal to or greater than 85 parts by mass and equal to or less than 98 parts by mass. If the content of the filler (B1) is within the above range, it is possible to improve the workability of the thermosetting resin composition (P) and to further improve the mechanical strength of the obtained resin member 14. The upper limit of the average particle size of the filler (B1) is not particularly limited, but is equal to or less than 100 μm, for example.

It is more preferable that the filler (B) contains, as the filler (B1) a fibrous filler or a plate-like filler having an average major axis length of equal to or greater than 5 μm and equal to or less than 50 mm and an average aspect ratio of equal to or greater than 1 and equal to or less than 1,000.

The average major axis length and the average aspect ratio of the filler (B1) can be measured using an SEM image as below. First, by using a scanning electron microscope, a plurality of fibrous fillers or plate-like fillers is imaged. From the images observed, 50 fibrous fillers or plate-like fillers are randomly selected, and a major axis length (fiber length in a case of fibrous filler or a major axis size in a plane direction in a case of plate-like filler) and a minor axis length (fiber diameter in a case of fibrous filler or the size in the thickness direction in a case of plate-like filler) of each of the fillers are measured. All of the major axis lengths are added up and divided by 50, thereby obtaining the average major axis length. Similarly, all of the minor axis lengths are added up and divided by 50, thereby obtaining the average minor axis length. Furthermore, a ratio of the average major axis length to the average minor axis length is determined as the average aspect ratio.

As the filler (B1), one kind of filler or more kinds of filler selected from glass fiber, carbon fiber, glass beads, and calcium carbonate are more preferable. If such a filler (B1) is used, the mechanical strength of the resin member 14 can be particularly improved.

Provided that the total content of the filler (B) is 100 parts by mass, the filler (B) contains a filler (B2) whose average particle size in a weight-based particle size distribution measured by a laser diffraction and scattering-type particle size distribution analysis method is equal to or greater than 0.1 µm and equal to or less than 5 µm, preferably in an amount of equal to or greater than 1 part by mass and equal to or less than 30 parts by mass, and more preferably in an amount equal to or greater than 2 parts by mass and equal to or less than 15 parts by mass. If the content of the filler (B2) is within the above range, it is possible to cause a sufficient amount of filler (B) to be present in the depression portions 201. As a result, it is possible to further improve the mechanical strength of the region in which the resin member 14 and the metal member 12 permeate to each other.

It is more preferable that the filler (B) contains, as the filler (B2), a fibrous filler or a plate-like filler having an average major axis length, which is preferably equal to or greater than 0.1 µm and equal to or less than 100 µm and more preferably equal to or greater than 0.2 µm and equal to or less than 50 µm, and an average aspect ratio which is preferably equal to or greater than 1 and equal to or less than 50 and more preferably equal to or greater than 1 and equal to or less than 40.

The average major axis length and the average aspect ratio of the filler (B2) can be measured using an SEM image as below. First, by using a scanning electron microscope, a plurality of fibrous fillers or plate-like fillers is imaged. From the images observed, 50 fibrous fillers or plate-like fillers are randomly selected, and a major axis length (fiber length in a case of fibrous filler or a major axis size in a plane direction in a case of plate-like filler) and a minor axis length (fiber diameter in a case of fibrous filler or the size in the thickness direction in a case of plate-like filler) of each of the fillers are measured. All of the major axis lengths are added up and divided by 50, thereby obtaining the average major axis length. Similarly, all of the minor axis lengths are added up and divided by 50, thereby obtaining the average minor axis length. Furthermore, a ratio of the average major axis length to the average minor axis length is determined as the average aspect ratio.

As the filler (B2), one kind of filler or two or more kinds of filler selected from wollastonite, kaolin clay, talc, calcium carbonate, zinc oxide, calcium silicate hydrate, aluminum borate whiskers, and potassium titanate fiber are more preferable.

It is preferable that the thermosetting resin composition (P) contains a solid lubricant as the filler (B). As the solid lubricant, for example, one kind or two or more kinds of lubricant selected from graphite, carbon fiber, and fluorine fiber are preferable. If the thermosetting resin composition (P) contains the solid lubricant, a coefficient of friction of the resin member 14 is reduced. Furthermore, in a case where the resin member 14 is used as a portion in which the cylinder 101 and piston 20 slide in the housing 10, the sliding properties can be improved, and hence the energy efficiency of the compressor 1 can be improved.

The surface of the filler (B) may be treated with a coupling agent such as a silane coupling agent (C) which will be described later.

The thermosetting resin composition (P) may further contain the silane coupling agent (C). If it contains the silane coupling agent (C), the adhesiveness between the resin member 14 and the metal member 12 can be further improved. Furthermore, if the thermosetting resin composition (P) contains the silane coupling agent (C), the affinity between the thermosetting resin (A) and the filler (B) can be improved, and hence the mechanical strength of the resin member 14 can be further improved.

The content of the silane coupling agent (C) is not particularly limited because it depends on the specific surface area of the filler (B). The content of the silane coupling agent (C) is preferably equal to or greater than 0.01 parts by mass and equal to or less than 4.0 parts by mass, and more preferably equal to or greater than 0.1 parts by mass and equal to or less than 1.0 part by mass, with respect to 100 parts by mass of the filler (B). If the content of the silane coupling agent (C) is within the above range, it is possible to sufficiently coat the filler (B) and to further improve the mechanical strength of the resin member 14.

Examples of the silane coupling agent (C) include an epoxy group-containing alkoxysilane compound such as γ-glycidoxypropyl trimethoxysilane, γ-glycidoxypropyl triethoxysilane, or β-(3,4-epoxycyclohexyl)ethyl trimethoxysilane; mercapto group-containing alkoxysilane compound such as γ-mercaptopropyl trimethoxysilane or γ-mercaptopropyl triethoxysilane; a ureido group-containing alkoxysilane compound such as γ-ureidopropyl triethoxysilane, γ-ureidopropyl trimethoxysilane, or γ-(2-ureidoethyl)aminopropyl trimethoxysilane; an isocyanato group-containing alkoxysilane compound such as γ-isocyanatopropyl triethoxysilane, γ-isocyanatopropyl trimethoxysilane, γ-isocyanatopropylmethyl dimethoxysilane, γ-isocyanatopropylmethyl diethoxysilane, γ-isocyanatopropylethyl dimethoxysilane, or γ-isocyanatopropylethyl diethoxysilane, or γ-isocyanatopropyl trichlorosilane; an amino group-containing alkoxysilane compound such as γ-aminopropyl triethoxysilane, γ-(2-aminoethyl)aminopropylmethyl dimethoxysilane, γ-(2-aminoethyl)aminopropyl trimethoxysilane, or γ-aminopropyl trimethoxysilane; a hydroxyl group-containing alkoxysilane compound such as γ-hydroxypropyl trimethoxysilane or γ-hydroxypropyl triethoxysilane; and the like.

One kind of these may be used singly, or two or more kinds of these may be used in combination.

From the viewpoint of improving the toughness of the resin member 14, the thermosetting resin composition (P) according to the present embodiment may further contain an elastomer (D). Here, in the present embodiment, the filler (B) is not included in the elastomer (D).

Provided that the total content of the resin member 14 is 100 parts by mass, the content of the elastomer (D) is preferably equal to or greater than 1 part by mass and equal to or less than 10 parts by mass, and more preferably equal to or greater than 1.5 parts by mass and equal to or less than 7 parts by mass. If the content of the elastomer (D) is within the above range, it is possible to further improve the toughness of the resin member 14 while maintaining the mechanical strength of the resin member 14. As a result, it is possible to obtain a metal-resin composite 16 in which the bond strength between the resin member 14 and the metal member 12 is further improved.

Examples of the elastomer (D) include unmodified polyvinyl acetate, polyvinyl acetate modified with carboxylic acid, polyvinyl butyral, natural rubber, isoprene rubber, styrene•butadiene rubber, butadiene rubber, chloroprene rubber, butyl rubber, ethylene•propylene rubber, acryl rubber, styrene•isoprene rubber, acrylonitrile•butadiene rubber, urethane rubber, silicon rubber, and fluorine rubber. One kind of these may be used singly, or two or more kinds thereof may be used in combination. Among these, unmodified polyvinyl acetate, polyvinyl acetate modified with carboxylic acid, acryl rubber, acrylonitrile•butadiene rubber, and polyvinyl butyral are preferable. If these elastomers are used, the toughness of the resin member 14 can be particularly improved.

The method for manufacturing the thermosetting resin composition (P) is not particularly limited. Generally, the composition can be manufactured by a known method. For example, the following method can be used. First, the thermosetting resin (A) in formulated with the filler (B), the silane coupling agent (C), the elastomer (D), a curing agent, an auxiliary curing agent, a release agent, a pigment, a flame retardant, a weatherproofing agent, an antioxidant, a plasticizer, a lubricant, a sliding agent, a foaming agent, and the like are which are used if necessary, and the resultant is uniformly mixed. Then, the obtained mixture is heated, melted, and kneaded using a kneading device such as a roll, a kneader, or a double-screw extruder alone or by a combination of a roll with other kneading devices. Finally, the obtained mixture is made into particles or pulverized, thereby obtaining the thermosetting resin composition (P).

The coefficient of linear expansion $\alpha_R$ of the resin member 14 within a range of 25° C. to a glass transition temperature of the resin member 14 is preferably equal to or greater than 10 ppm/° C. and equal to or less than 50 ppm/° C., and more preferably equal to or greater than 15 ppm/° C. and equal to or less than 45 ppm/° C. If the coefficient of linear expansion $\alpha_R$ is within the above range, the reliability of temperature cycle of the metal-resin composite 16 can be further improved.

From the viewpoint of weight lightening, the density of the resin member 14 is preferably equal to or less than 2.5 g/cm$^3$, and more preferably equal to or less than 2.0 g/cm$^3$.

The thermal conductivity of the resin member 14 is preferably equal to or less than 90 W/(m·K), and more preferably equal to or less than 1 W/(m·K). If the thermal conductivity is equal to or less than the upper limit described above, thermal insulating properties of the compressor 1 are improved and accordingly, the energy efficiency of the compressor 1 can be improved. The thermal conductivity can be measured by a laser flash method. In a case where the thermal conductivity has anisotropy, thermal conductivity in a direction perpendicular to the bonding surface 103 between the metal member 12 and the resin member 14 is adopted.

Metal-Resin Composite

Next, the metal-resin composite 16 according to the present embodiment will be described.

In the metal-resin composite 16, the resin member 14 and the metal member 12 are bonded to each other.

In the metal-resin composite 16, the absolute value of a difference ($\alpha_R - \alpha_M$) between a coefficient of linear expansion $\alpha_R$ of the resin member 14 within a range of 25° C. to a glass transition temperature of the resin member 14 and a coefficient of linear expansion $\alpha_M$ of the metal member 12 within a range of 25° C. to the glass transition temperature of the resin member 12 is preferably equal to or less than 25 ppm/° C., and more preferably equal to or less than 10 ppm/° C. If the difference between the coefficients of linear expansion is equal to or less than the upper limit described above, it is possible to suppress the thermal stress which occurs due to the difference of linear expansion when the metal-resin composite 16 exposed to a high temperature. Therefore, as long as the difference between the coefficients of linear expansion is equal to or less than the upper limit described above, it is possible to maintain the bond strength between the resin member 14 and the metal member 12 even at a high temperature. That is, as long as the difference of the coefficient of linear expansion is equal to or less than the upper limit described above, it is possible to improve the dimensional stability of the metal-resin composite 16 at a high temperature.

In the present embodiment, in a case where the coefficient of linear expansion has anisotropy, the average thereof is adopted. For example, in a case where the resin member 14 has a sheet shape, if there is a difference between the coefficient of linear expansion in the flow direction (MD) and the coefficient of linear expansion in the direction (TD) perpendicular to MD, the average thereof is determined as the coefficient of linear expansion $\alpha_R$ of the resin member 14.

The metal-resin composite 16 is not particularly limited, but is preferably a composite in which the resin member 14 and the metal member 12 are directly bonded to each other without the aid of an adhesive. The resin member 14 and the metal member 12 have excellent bond strength even if an adhesive is not used. Therefore, the manufacturing process of the metal-resin composite 16 can be simplified.

In a case where the thermosetting resin composition (P) containing the filler (B) is used, the filler (B) is present in the depression portions 201. The average major axis length of the filler (B) present in the depression portions 201 that is determined by the analysis of an image of scanning electron microscope is preferably equal to or greater than 0.1 µm and equal to or less than 5.0 µm, and more preferably equal to or greater than 0.2 µm and equal to or less than 4 µm. If the average major axis length is within the above range, it is possible to further improve the mechanical strength of the region in which the resin member 14 and the metal member 12 permeate to each other.

The average aspect ratio of the filler (B) present in the depression portions 201 is preferably equal to or greater than 1 and equal to or less than 50, and more preferably equal to or greater than 1 and equal to or less than 40.

The average major axis length and the average aspect ratio of the filler (B) present in the depression portions 201 can be measured using an SEM image as below. First, by using a scanning electron microscope, a section of the roughened layer 104 is imaged. From the image observed, 50 fillers (B) present in the depression portions 201 are randomly selected, and a major axis length (fiber length in a case of fibrous filler or a major axis size in a plane direction in a case of plate-like filler) and a minor axis length (fiber diameter in a case of fibrous filler or the size in the thickness direction in a case of plate-like filler) of each of the fillers are measured. All of the major axis lengths are added up and divided by 50, thereby obtaining the average major axis length. Similarly, all of the minor axis lengths are added up and divided by 50, thereby obtaining the average minor axis length. Furthermore, a ratio of the average major axis length to the average minor axis length is determined as the average aspect ratio.

The filler (B) present in the depression portions 201 is preferably one kind of filler or two or more kinds of filler selected from the group consisting of wollastonite, kaolin clay, talc, calcium carbonate, zinc oxide, calcium silicate hydrate, aluminum borate whiskers, and potassium titanate fiber.

In a case where the resin member 14 contains the elastomer (D), the resin member 14 preferably has a sea-island structure, and the elastomer (D) is preferably present in sea-islands.

If such a structure is adopted, it is possible to improve the toughness of the resin member 14 and to improve the impact resistance of the metal-resin composite 16. As a result, even if an external impact is exerted on the metal-resin composite 16, the bond strength between the resin member 14 and the metal member 12 can be maintained.

The sea-island structure can be observed using an image of a scanning electron microscope.

The average diameter of the sea-islands that is determined through the image analysis performed on the image of a scanning electron microscope is preferably equal to or greater than 0.1 μm and equal to or less than 100 μm, and more preferably equal to or greater than 0.2 μm and equal to or less than 30 μm. If the average diameter of the sea-islands is within the above range, it is possible to further improve the toughness of the resin member 14 and to further improve the impact resistance of the metal-resin composite 16.

The average diameter of the sea-islands can be determined using an image of a scanning electron microscope (SEM) as below. First, by using a scanning electron microscope, a section of the resin member 14 is imaged. From the image observed, 50 sea-islands present the resin member 14 are randomly selected, and the diameters of them are measured respectively. All of the diameters of the sea-islands are added up and divided by 50, thereby obtaining the average diameter.

From the viewpoint, of improving strength of the housing 10, the bending strength of the metal-resin composite 16 is preferably equal to or greater than 150 MPa, and more preferably equal to or greater than 200 MPa. The bending strength can be measured based on JIS K 7171. As a test piece, a substance in which the resin member 14 and the metal member 12 are laminated on and bonded to each other and a thickness ratio $d_1/d_2$ thereof is 3 is used. By making the resin member 14 side of the test piece cave in, the bending strength is measured. Furthermore, the bending strength can be converted from measurement results obtained using a Dynstat tester. Specifically, provided that a test piece having a width of b [mm] and a thickness of h [mm] has a bending moment M [kg·cm] measured using a Dynstat tester, a bending strength $\sigma_f$ [MPa] can be calculated from a relation of $\sigma_f=9.0\times6\times10\times M/(bh^2)$ For example, the width b, the thickness, and the depth of the test piece used in the Dynstat test can be set to be 4 mm, 4 mm, and 15 mm respectively.

In the present invention, the bending strength can be evaluated by preparing an appropriate test piece by cutting off the test piece from the housing 10. At this time, the test piece includes only one bonding surface between the metal member 12 and the resin member 14.

The metal-resin composite 16 preferably exhibits low permeability with respect to a refrigerant gas. The permeability of a refrigerant gas can be evaluated by measuring a coefficient of gas permeability based on JIS K 7126-1 by using a pressure sensor method. The refrigerant gas is, for example, freon gas. The coefficient of gas permeability measured using freon gas is preferably less than $1\times10^{16}$ mol·m/(m²·s·Pa) and more preferably less than $5\times10^{17}$ mol·m/(m²·s·Pa). If the coefficient of gas permeability is less than the upper limit described above, an efficiently functioning compressor 1 can be provided.

In the present invention, the permeability of a refrigerant gas can be evaluated by preparing an appropriate test piece by cutting off the test piece from the housing 10. At this time, the test piece includes only on bonding surface between the metal member 12 and the resin member 14. Furthermore, as the test piece, the one in which a ratio d1/d2 between the thickness $d_1$ of the resin member 14 and the thickness $d_2$ of the metal member 12 is 2 is used.

The housing 10 may include only one metal member 12 or a plurality of metal members 12.

Hereinafter, a method for manufacturing the housing 10 will be described. Here, the method for manufacturing the housing 10 according to the present embodiment is merely an example of a method for manufacturing the housing 10 composed of the metal-resin composite 16 having 1,000,000-time bending fatigue resistance described above. The housing 10 may be manufactured by other methods as long as it is manufactured as a housing composed of the metal-resin composite 16 having 1,000,000-time bending fatigue resistance. The method for manufacturing the housing 10 is not particularly limited, and examples thereof include an injection molding method, a transfer molding method, a compression molding method, an injection and compression molding method, and the like.

FIGS. 5A to 5D are views for illustrating an example of the method for manufacturing the housing 10 according to the present embodiment. The method for manufacturing the housing 10 according to the present embodiment includes a step of preparing the metal member 12 and a mold 8, a step of disposing the metal member 12 in a molding space 810 of the mold 8, a step of filling the molding space 810 with a fluidized resin material 850 containing the thermosetting resin (P), and a step of obtaining the housing 10 composed of the metal-resin composite 16, in which the resin member 14 and the metal member 12 are bonded to each other, by curing the resin material 850 filling the molding space, in this order. These steps will be specifically described below.

In the method for manufacturing the housing 10 according to the present embodiment, the mold 8 includes a first mold portion 81 and a second mold portion 82. In the mold 8 used, the molding space 810 is formed by the first mold portion 81 and the second mold portion 82. The first mold portion 81 and the second mold portion 82 mean a portion of the mold 8, and the mold 8 may further include a nest or a slide core.

In the method for manufacturing the housing 10 according to the present embodiment, during the step of filing the molding space 810 with the fluidized resin material 850, it is preferable to fill the molding space 810 with the resin material 850 while pressing the metal member 12 on a molding surface of either the first mold portion 81 or the second mold portion 82 by using the flow pressure of the resin material 850. In this way, it is possible to inhibit the occurrence of burrs and to obtain a housing 10 having excellent quality that is excellent in the adhesiveness between the metal member 12 and the resin member 14.

Hereinafter, the method for manufacturing the housing 10 according to the present embodiment will be specifically explained by describing a case where a mold for transfer molding is used as the mold 8, for example. In the method for manufacturing the housing 10 according to the present embodiment, as the mold 8, a mold for transfer molding, a mold for injection molding, or a mold of compression molding may be used. In a case where a mold for injection molding or a mold for compression molding is used, the same effect as in a case where a mold for transfer molding is used is obtained. In the present embodiment, from the viewpoint of improving the controllability of dimensional accuracy of a molded article, a mold for transfer molding is used.

In the present embodiment, a case where the outer surface of the housing 10 is formed using a plurality of metal members 12 will be specifically descried, for example. Herein, the present invention is not limited to this method, and for example, the housing 10 may be manufactured using a single metal member 12 in which the respective portions constituting the outer surface are integrated. If the housing 10 is manufactured using a plurality of metal members 12, a large metal member 12 does not need to be prepared, and the manufacturing costs are reduced. In contrast, if the integrated metal member 12 is used, the strength of the housing 10 can be improved. The shape and disposition of the metal member 12 can be appropriately determined according to the structure of the housing 10.

As described above, FIGS. 5A to 5D are views for illustrating an example of the method for manufacturing the housing 10 according to the present embodiment. In FIGS. 5A to 5D, the shapes of the metal member 12 and the resin member 14 are described in a simplified manner. FIG. 5A is a view showing the structure of the mold 8 in which the metal member 12 has not yet been disposed. FIG. 5B is a view for illustrating a step of disposing the metal member 12. FIG. 5C is a view for illustrating a step of filling the molding space 810 with the resin material 850. FIG. 5D is a view for illustrating a step of obtaining the housing 10 by curing the resin material 850.

First, the mold B shown in FIG. 5A is prepared. The mold 8 according to the present embodiment includes the first mold portion 81 and the second mold portion 82. By combining the first mold portion 81 and the second mold portion 82, the molding space 810 in which the metal member 12 will be disposed in the next step is formed. The second mold portion 82 is provided with a pot 820 which is filled with the resin material 850 before molding, a plunger 830 which includes an auxiliary rammer to be inserted into the pot 820 so as to melt the resin material 850 by applying pressure, and a sprue 840 which injects the melted resin material 850 into the molding space 810. The mold 8 according to the present embodiment may be applied to a plunger-type transfer molding machine including an auxiliary rammer as shown in FIG. 5A or applied to a pot-type transfer molding machine (not shown in the drawing) without an auxiliary rammer.

From the viewpoint of improving adhesiveness, durability, and the like, as the metal member 12, it is preferable to prepare a metal member 12 in which a region that will be bonded to at least the resin member 14 has undergone a roughening treatment.

Next, the step of disposing the metal member 12 will be described.

As shown in FIG. 5B, the metal member 12 is disposed in the molding space 810 of the mold 8. Specifically, the first mold portion 81 is pulled down such that the mold 8 is opened, and in this state, the metal member 12 is disposed in a portion corresponding the molding space 810 without being fixed thereto. If the metal member 12 is disposed in this way, when the melted resin material 850 is introduced into the molding space 810, by the flow pressure of the introduced resin, the metal member 12 can be pressed on the wall surface (molding surface) of one of the mold member of the first mold portion 81 and the second mold portion 82. In the present embodiment, the metal member 12 is pressed on the wall surface of the first mold portion 81. As a result, it is possible to prevent the occurrence of an insert margin, which is formed in a case where the resin material is introduced into the mold in a state where the metal member is fixed into the mold, or the occurrence of burrs which are formed because the resin flows in from a gap between the metal member 12 and the wall surface of the mold. Furthermore, it is possible to manufacture a housing 10 excellent in the adhesiveness between the metal member 12 and the resin member 14.

Herein, it is preferable that the metal member 12 is disposed in a state where it is brought into contact in advance with the wall surface (molding surface) of either the first mold portion 81 or the second mold portion 82. If the metal member 12 is disposed in this state, it is possible to effectively prevent the melted resin material 850 from flowing into the gap between the metal member 12 and the wall surface of the mold member.

The metal member 12 has a plate shape or a sheet shape that complies with the wall surface of the first mold portion 81 or the second mold portion 82 on which the metal member 12 is pressed. It the metal member 12 has such a shape, the surface of the metal member 12 can receive the flow pressure of the resin material 850, and consequently, the metal member 12 can be reliably pressed on the wall surface (molding surface) of either the second mold portion 82 or the first mold portion 81. As a result, it is possible to prevent the positional deviation of the metal member 12 caused when the resin material 850 is introduced into the molding space 810, and to reliably inhibit the occurrence of burrs.

Next, the step of filling the molding space 810 with the resin material 850 (FIG. 5C) and the step of obtaining the housing 10 by curing the resin mater 850 (FIG. 5D) will be described.

In the step of filing the molding space 810 with the resin material 850 according to the present embodiment, first, the first mold portion 81 is pulled up such that the mold 8 is closed, and in this state, the pot 820 is filled with the resin material 850 before molding. The properties of the resin material 850 before molding are not particularly limited. The resin material 850 may remain in the form of powder or granules of the thermosetting resin composition (P) or may be formed into cylindrical tablets composed of the thermosetting resin composition (P). Furthermore, the resin material 850 may be in a semi-molten state by being preheated by a pre-heater or the like. Then, in order to melt the resin material 850 injected into the pot 820, pressure is applied to the resin material 850 by inserting the plunger 830 including an auxiliary rammer into the pot 820. Thereafter, the melted resin material 850 is introduced into the molding space 810 through the sprue 840. The resin material 850 introduced into the molding space 810 flows in a direction indicated by a dotted line shown in FIG. 5C. The metal member 12 is then pressed on the first mold portion 81 by the flow pressure of the resin material 850, and in this way, the metal member 12 can be seemingly in a state of being fixed to the wall surface of the mold member. At this time, melting of the resin material 850 in the pot 820 and introduction and filling of the melted resin material 850 into the molding space 810 simultaneously proceed. Then, the resin material 850 with which the molding space 810 is filled is cured by being heated and pressurized, and as a result, the metal-resin composite 16 composed of the metal member 12 and the resin member 14 is formed (FIG. 5D). By opening the mold 8 after curing of the resin material 850, the occurrence of burrs is inhibited, and a housing part 10 having excellent quality that is excellent in the adhesiveness between the metal member 12 and the resin member 14 can be obtained. A cured material (cull) of the resin material 850 remaining in the pot 820 and a cured material in the sprue 840 are separated from the metal-resin composite 16 by pulling up the plunger 830 before the mold 8 is opened.

The resin material 850 introduced into the molding space 810 in the present step does not flow back and runs in one direction. Therefore, in a case where the thermosetting resin composition (P) contains a fibrous filler, the mechanical strength of the resin member 14 can be improved. If the resin material 850 introduced into the molding space 810 runs in one direction without flowing back, the orientation of the fibrous filler in the cured resin member 14 can be controlled. If the orientation of the fibrous filler can be controlled, by the method for manufacturing the housing 10 according to the present embodiment, it is possible to obtain a housing 10 with excellent quality that is uniform in view of strength.

In the step of filing the molding space 810 with the resin material 850, it is preferable to introduce the melted resin material 850 into the molding space 810 after deaerating the inside of the molding space 810. If the resin material 850 is introduced in the above manner, a likelihood that voids will occur in the next step in the resin member 14 obtained by curing can be reduced. Accordingly, a housing 10 with further improved mechanical strength can be obtained.

It is preferable that the thermosetting resin composition (P) has high fluidity such that molding is excellently performed. Therefore, a melt viscosity of the thermosetting resin composition (P) at 175° C. is preferably equal to or greater than 10 Pa·s and equal to or less than 3,000 Pa·s, and more preferably equal to or greater than 30 Pa·s and equal to or less than 2,000 Pa·s. The melt viscosity at 175° C. can be measured using a heat flow evaluator (flow tester) manufactured by Shimadzu Corporation, for example.

It is preferable that the thermosetting resin composition (P) shows the following viscosity behavior. When the thermosetting resin composition (P) is heated from 60° C. by using a dynamic viscoelasticity measurement instrument at a heating rate of 3° C./min and a frequency of 1 Hz such that the composition becomes in a molten state, the melt viscosity of the thermosetting resin composition (P) is reduced during the initial stage but increases after the composition reaches the lowest melt viscosity, and the lowest melt viscosity is within a range of equal to or greater than 10 Pa·s and equal to or less than 2,000 Pa·s.

If the lowest melt viscosity is equal to or greater than the lower limit described above, in a case where the thermosetting resin composition (P) contains the filler (B), it is possible to inhibit a phenomenon in which the thermosetting resin (A) flows alone due to the separation between the thermosetting resin (A) and the filler (B), and to obtain a more homogeneous resin member 14.

If the lowest melt viscosity is equal to or less than the upper limit described above, the permeability of the thermosetting resin composition (P) into the depression portions 201 can be improved, and thus the filler (B) can be sufficiently supplied into the depression portions 201. As a result, it is possible to further improve the mechanical strength of the region in which the resin member 14 and the metal member 12 permeate to each other.

The temperature at which thermosetting resin composition (P) reaches the lowest melt viscosity is preferably within a range of equal to or higher than 100° C. and equal to or lower than 250° C.

If the thermosetting resin composition (P) shows the viscosity behavior described above, it is possible to inhibit the permeation of air into the thermosetting resin composition (P) at the time of forming the resin member 14 by heating and curing the thermosetting resin composition (P), and to thoroughly discharge a gas dissolved in the thermosetting resin composition (P) to the outside. As a result, it is possible to inhibit the generation of air bubbles in the resin member 14. By the inhibition of the generation of air bubbles, the mechanical strength of the resin member 14 can be further improved.

In order to realize the thermosetting resin composition (P) showing the viscosity behavior described above, for example, the type or amount of the thermosetting resin (A), the type or amount of the filler (B), and the type or amount of the elastomer (D) described above should be appropriately adjusted.

In the present embodiment, the molding conditions of the metal-resin composite 16 are not particularly limited. For example, it is possible to employ the molding conditions of a temperature of 160° C. to 180° C., a pressure of 10 MPa to 30 MPa, and a curing time of 30 seconds to 5 minutes.

The housing 10 obtained by the manufacturing method described above is a high-quality housing solving the problems such as insert margin or the occurrence of burrs formed because the resin material 850 flows in from the gap between the metal member 12 and the mold member. Furthermore, in the housing 10 according to the present embodiment, there is no difference in level at a site where the metal member 12, in which the occurrence of burrs is inhibited, and the resin member 14 are bonded to each other. Therefore, in the housing 10, mechanical strength and rigidity are excellently balanced, and the housing 10 can be used for a long period of time.

The compressor 1 according to the present embodiment is manufactured by combining the housing 10 and other parts. Other parts can be manufactured by generally known methods.

Next, the operation and effect of the present embodiment will be described. The housing 10 according to the present embodiment is composed of the metal-resin composite 16 having 1,000,000-time bending fatigue resistance. Therefore, it is possible to provide a housing in which performances including lightweight properties and high resistance are excellently balanced.

The housing 10 according to the present embodiment is composed of the metal-resin composite 16 including the resin member 14. Therefore, the housing 10 according to the present embodiment can maintain necessary strength, while the weight thereof can be further reduced compared to the weight of a housing 10 solely composed of the same type of metal. As a result, even if the housing 10 according to the present embodiment is mounted on a vehicle, an energy saving vehicle can be realized. Furthermore, because the metal-resin composite 16 has excellent thermal insulating properties, a compressor 1 having excellent energy efficiency can be realized. In addition, due to a high degree of freedom of processing, the housing 10 and the compressor 1 can be efficiently manufactured. Moreover, a housing 10 having a complicated shape can be manufactured.

The housing 10 according to the present embodiment is composed of the metal-resin composite 16 including the metal member 12. Therefore, it is possible to provide a compressor 1 that seals better a refrigerant gas and has better energy efficiency compared to a compressor having a housing 10 solely composed of a resin. Furthermore, it is possible to provide a housing 10 and a compressor 1 having excellent strength or durability.

Hitherto, the embodiment of the present invention has been described with reference to drawings. The embodiment is merely an example of the present invention, and various constitutions other than the above can also be adopted.

EXAMPLES

Hereinafter, the present embodiment will be specifically described with reference to examples and comparative examples, but the present embodiment is not limited to the description of the examples.

Example 1

<Preparation of Thermosetting Resin Composition (P1)>
34.3 parts by mass of a novolac-type phenolic resin (PR-51305, manufactured by Sumitomo Bakelite Co., Ltd.), 6.0 parts by mass of hexamethylenetetramine as a curing agent, 57.1 parts by mass of glass fiber (manufactured by Nitto Boseki Co., Ltd.) as a filler, 0.2 parts by mass of γ-aminopropyl triethoxysilane (manufactured by Shin-Etsu Chemical Co., Ltd.) as a silane coupling agent, 0.5 parts by mass of magnesium oxide (manufactured by Konoshima Chemical Co., Ltd.) as an auxiliary curing agent, and 1.9 parts by mass of other components such as a lubricant were subject to dry mixing. The mixture was subjected to melt kneading by using a heating role with a temperature of 90° C. such that the mixture in formed into a sheet, and the resultant was cooled and pulverized, thereby obtaining a granular thermosetting resin composition (P1).

<Evaluation of Thermosetting Resin Composition (P1)>
(Melt Viscosity of Thermosetting Resin Composition (P1))
By using a flow characteristic evaluator (Koka-type flow tester, CFT-500D), a melt viscosity of the thermosetting resin composition (P1) at 175° C. was measured. The melt viscosity of the thermosetting resin composition (P1) at 175° C. was 425 Pa·S.

<Preparation of Metal Member>
As a metal sheet having not yet been subjected to surface treatment, a metal sheet A (80 mm×10 mm, thickness: 1.0 mm, density: 2.6 g/cm$^3$, thermal conductivity: 138 W/(m·K)) of an aluminum alloy A5052 whose surface was sufficiently polished with #4000 polishing paper was prepared. An aqueous solution of potassium hydroxide (16 parts by mass), zinc chloride (5 parts by mass), sodium nitrate (5 parts by mass), and sodium thiosulfate (13 parts by mass) was prepared. The metal sheet A was dipped into the obtained aqueous solution (30° C.) and shaken, thereby dissolving the metal sheet by 15 μm (calculated from the reduced weight of aluminum) in the depth direction. Then, the metal sheet A was washed with water, dipped into 35 parts by mass of an aqueous nitric acid solution (30° C.), and shaken for 20 seconds. Thereafter, the metal sheet A was washed with water and dried, thereby obtaining a metal sheet 1.

<Evaluation of Metal Member>
(Surface Roughness)
By using a super-depth profile measuring microscope (VK9700 manufactured by KEYENCE CORPORATION), the surface shape of the bonding surface of the metal member that was bonded to the resin member was measured at 20× magnification. At this time, the surface roughness Ra and Rz were measured based on JIS-B0601.
Ra and Rz of the metal sheet 1 were 4.0 μm and 15.5 μm respectively.

(Specific Surface Area)
The sample to be measured was dried in a vacuum for 6 hours at 120° C. Then, by using an automatic specific surface area/pore distribution analyzer (BELSORPmini II manufactured by BEL Japan, Inc.), the amount of nitrogen adsorbed onto and desorbed from the sample at the temperature of liquid nitrogen was measured. The actual surface area based on the nitrogen adsorption BET method was calculated from the BET plot. The actual surface area measured by the nitrogen adsorption BET method was divided by the apparent surface area, thereby calculating the specific surface area. The specific surface area of the metal sheet 1 was 270.

(Degree of Glossiness of Surface of Metal Member)
A degree of glossiness of the surface of the metal member was measured based on ASTM-D523 at a measurement angle of 60° (incidence angle: 60°, reflection angle: 60°) by using a digital gloss meter (20°, 60°) (GM26 model, manufactured by MURAKAMI COLOR RESEARCH LABORATORY CO., Ltd.). The degree of glossiness of the metal sheet 1 was 10.

<Preparation of Metal-Resin Composite>
By the obtained thermosetting resin composition (P1) and the metal sheet 1, a metal-resin composite 1 was prepared. Specifically, the composite was prepared according to the following procedure. First, a mold consisting of a first mold portion and a second mold portion was prepared, and the metal sheet 1 having a thickness of 1 mm was disposed in the mold without being fixed to the mold. Then, the first mold portion and the second mold portion were fastened by a mold clamp, thereby forming a molding space, in which the metal sheet 1 was disposed, between the first mold portion and the second mold portion. Thereafter, the thermosetting resin composition (P1) melted in the pot provided in the second mold portion was injected into the molding space through a sprue and molded. The melting of the thermosetting resin composition (P1) in the pot and the introduction of the thermosetting resin composition (P1) into the molding space were performed simultaneously, and by the fluid pressure of the thermosetting resin composition (P) introduced, the metal sheet 1 was pressed on the inner wall of the mold. The thermosetting resin composition (P1) was molded under conditions of an effective pressure of 20 MPa, a mold temperature of 175° C., and a curing time of 3 minutes. In this way, a metal-resin composite 1 (composite member) was obtained which is a sheet constituted with the thermosetting resin composition (P1) and consisting of two layers composed of a resin member sheet (resin member) having a thickness of 3 mm and the metal sheet 1 (metal member) having a thickness of 1 mm. The metal-resin composite 1 was named a test piece 1.

<Evaluation of Resin Member>
(Thermal Conductivity and Density)
A resin sample having a thickness of 2 mm was cut off from the resin member sheet of the prepared test piece 1. By using a laser flash method, the thermal conductivity of the resin member in the thickness direction was measured. Furthermore, the density of the resin member was measured. The resin member of the test piece 1 had a thermal conductivity of 0.4 W/(m·K) and a density of 1.78 g/cm$^3$.

<Evaluation of Metal Member>
(Average Depth of Depression Portions)
A section of the bonding portion between the metal member and the resin member of the test piece 1 was imaged using a scanning electron microscope (SEM), and the structure of the section of the bonding portion was observed. From the observed image, the thickness of the roughened layer of the metal member and the average depth of the depression portions was determined respectively. The thickness of the roughened layer of the metal member of the test piece 1 was 15 μm, and the average depth of the depression portions was 13 μm. Furthermore, the section of each depression portion had such a shape that, between an opening portion and a bottom portion of the depression portion, there is at least a portion whose section width was greater than a section width of the opening portion.

(1,000,000-Time Bending Fatigue Resistance)

By the method described in the present embodiment, 1,000,000-time bending fatigue resistance of the test piece 1 was evaluated. The metal member side of the test piece 1 was brought into contact with two supporting points, and an indenter was brought into contact with the center of the resin member side. By setting a frequency of repeating stress to be 30 Hz and setting a distance L between supporting points to be 64 mm, a bending stress of 140 MPa was continuously applied 1,000,000 times to the test piece 1 in an atmosphere at 25° C. In a case where fracture or peeling did not occur even if stress was repeatedly applied 1,000,000 times, the test piece was evaluated to be O, and in a case where fracture or peeling occurred while stress was being repeatedly applied 1,000,000 times, the test piece was evaluated to be x. The test piece 1 was evaluated to be because it did not suffer from fracture or peeling even if stress was repeatedly applied 1,000,000 times.

(Bending Strength)

The bending strength of the test piece 1 was measured based on JIS K 7171. At this time, for the test piece of the composite member, the metal member side was brought into contact with two supporting points, an indenter was brought into contact with the center of the resin member side, and three-point stress was applied thereto. By setting a test rate to be 2 mm/min and a distance L between supporting points to be 64 mm, the bending strength was measured in an atmosphere at 25° C. The bending strength of the test piece 1 was 273 MPa.

(Refrigerant Impermeability)

The refrigerant gas impermeability of the test piece 1 was evaluated. A coefficient of gas permeability was measured based on JIS K 7126-1 by using a pressure sensor method. First, a measurement sample having a thickness of 3 mm was cut off from the test piece 1. At this time, for the test piece of the metal-resin composite, the measurement sample was cut off such that the thickness of the metal member became 1 mm and the thickness of the resin member became 2 mm. As a testing gas, 134a freon gas was used. In a case where the measured coefficient of gas permeability was less than $5 \times 10^{17}$ mol·m/(m$^2$·s/Pa), the sample was evaluated to be O, and in a case where the measured coefficient of gas permeability was equal to or greater than $5 \times 10^{17}$ mol·m/(m$^2$·s/Pa), the sample was evaluated to be x.

<Preparation of Housing>

Under the same conditions as used for preparing the test piece 1, a housing of a compressor composed of a metal-resin composite was prepared, and a swash plate-type compressor using the housing was prepared. As parts of the compressor other than the housing, those fabricated by generally known methods were prepared. The housing was prepared such that a sliding portion for cylinders and pistons was composed of a resin member. The assembled compressor was constituted such that the outermost surface thereof was covered with a metal member.

(Evaluation of Performance of Compressor)

An air conditioner using the prepared compressor was driven in a set-up in which the temperature of 1 m$^3$ space was lowered 3° C. from room temperature. In a case where the air conditioner functioned to lower the spatial temperature down to the set value, the performance of the compressor was evaluated to be O, and in a case where the air conditioner did not function, the performance of the compressor was evaluated to be x.

(Evaluation of Durability)

The prepared compressor was continuously driven for 24 hours. Then, the housing was detached from the compressor and observed. In a case where the housing was not damaged, the durability was evaluated to be O. In a case where the housing was damaged but the damage was not problematic for the housing to be used as a product, the durability was evaluated to be Δ. In a case where the housing was damaged and the damage will cause problems, the durability was evaluated to be x.

Example 2

A metal-resin composite 2 was prepared by the same method as in Example 1, except that the following thermosetting resin composition (P2) was used instead of the thermosetting resin composition (P1). The metal-resin composite 2 was used as a test piece 2 and evaluated in the same manner as in Example 1.

<Preparation of Thermosetting Resin Composition (P2)>

A reaction tank equipped with a reflux condenser stirrer, a heating device, and a vacuum dehydration device was filled with phenol (p) and formaldehyde (f) at a molar ratio (f/p) of 1.7, and zinc acetate was added thereto in an amount of 0.5 parts by mass with respect to 100 parts by mass of phenol. The pH of the reaction system was adjusted to be 5.5, and a reflux reaction was performed for 3 hours. Then, by performing steam distillation or 2 hours at a degree of vacuum of 100 Torr and a temperature of 100° C., unreacted phenol was removed, and the resultant was further reacted for 1 hour at a degree of vacuum of 100 Torr and a temperature of 115° C. in this way, a dimethylene ether-type solid having a number average molecular weight of 800 was obtained as a resol-type phenolic resin.

25.3 parts by mass of the obtained resol-type phenolic resin, 10.7 parts by mass of a novolac-type phenolic resin (PR-51305, manufactured by Sumitomo Bakelite Co., Ltd.), 53.5 parts by mass of glass fiber (manufactured by Nitto Boseki CO., Ltd.) as a filler, 4.9 parts by mass of clay (manufactured by Engelhard Corporation) as a filler, 0.5 parts by mass of γ-aminopropyl triethoxysilane (manufactured by Shin-Etsu Chemical Co., Ltd.) as a silane coupling agent, 1.8 parts by mass of slaked lime (manufactured by Chichibu Lime industry CO., LTD) as an auxiliary curing agent, and 3.3 parts by mass of other components such as a lubricant were subjected to dry mixing. The mixture was subjected to melt kneading by using a heating role with a temperature of 90° C. such that the mixture is formed into a sheet, and the resultant was cooled and pulverized, thereby obtaining a granular thermosetting resin composition (P2).

A melt viscosity of the thermosetting resin composition (P2) at 175° C. was 435 Pa·S. The resin member of the test piece 2 had a thermal conductivity of 0.4 W/(m·K) and a density of 1.79 g/cm$^3$.

Example 3

A metal-resin composite 3 was prepared by the same method as in Example 1, except that the following thermosetting resin composition (P3) was used instead of the thermosetting resin composition (P1). The metal-resin composite 3 was used as a test piece 3 and evaluated in the same manner as in Example 1.

<Preparation of Thermosetting Resin Composition (P3)>

34.0 parts by mass of a novolac-type phenolic resin (PR-51305, manufactured by Sumitomo Bakelite Co. Ltd.), 21.0 parts by mass of graphite as a filler, 30.0 parts by mass of carbon fiber (manufactured by Zoltek Companies, Inc.) as a filler, 6.0 parts by mass of hexamethylenetetramine as a curing agent, 1.5 parts by mass of magnesium oxide (manufactured by Konoshima Chemical Co., Ltd.) as an auxiliary curing agent, and 7.5 parts by mass of other components such as a lubricant were subjected to dry mixing. The mixture was subjected to melt kneading by using a heating role with a temperature of 90° C. such that the mixture is formed into a sheet, and the resultant was cooled and pulverized, thereby obtaining a granular thermosetting resin composition (P3).

A melt viscosity of the thermosetting resin composition (P3) at 175° C. was 430 Pa·S. The resin member of the test piece 2 had a thermal conductivity of 0.4 W/(m·K) and a density of 1.46 g/cm$^3$.

Example 4

A metal-resin composite 4 was prepared by the same method as in Example 1, except that, instead of the sheet A, as a metal sheet which had not undergone a surface treatment, metal sheet B (80 mm×10 mm, thickness: 1.0 mm, density: 2.71 g/cm$^3$, thermal conductivity: 92 W/(m·K)) of an aluminum die cast ADC12 whose surface was sufficiently polished with #4000 polishing paper was used. The metal sheet B was treated by the same method a in Example 1, thereby obtaining a metal sheet 2 instead of the metal sheet 1. The metal-resin composite 4 was used as a test piece 4 and evaluated in the same manner as in Example 1.

The metal sheet 2 had the following properties.
Ra: 5 μm.
Rz: 16 μm
Thickness of roughened layer: 20 μm
Average depth of depression portions: 17 μm
Specific surface area: 280
Degree of glossiness: 8

The section of each depression portion had such a shape that, between an opening portion and a bottom portion of the depression portion, there is at least a portion whose section width was greater than a section width of the opening portion.

Example 5

A metal-resin composite 5 was prepared by the same method as in Example 1, except that the following metal sheet 3 was used instead of the metal sheet 1. The metal-resin composite 5 was used as a test piece 5 and evaluated in the same manner as in Example 1. The metal sheet 3 was obtained as below. First, a metal sheet C (80 mm×10 mm, thickness: 1.0 mm, density: 7.93 g/cm$^3$, thermal conductivity: 16.7 W/(m·K)) of stainless steel SUS304 which had not undergone a surface treatment was prepared. Furthermore, an aqueous solution of sulfuric acid (50 parts by mass) copper (II) sulfate pentahydrate (3 parts by mass), potassium chloride (3 parts by mass), and thiosalicylic acid (0.0001 parts by mass) was prepared. The metal sheet C was dipped into the obtained aqueous solution (30° C.) and shaken, thereby dissolving the metal sheet by 15 μm (calculated from the reduced weight of stainless steel) in the depth direction. Then, the metal sheet C was washed with water and dried, thereby obtaining the metal sheet 3.

The metal sheet 3 had the following properties.
Ra: 3 μm
Rz: 15 μm
Thickness of roughened layer: 15 μm
Average depth of depression portions: 13 μm
Specific surface area: 270
Degree of glossiness: 10

The section of each depression portion had such a shape that, between an opening portion and a bottom portion of the depression portion, there is at least a portion whose section width was great than a section width of the opening portion.

Comparative Example 1

A test piece not including a resin member was prepared. Specifically, as a metal sheet which had not undergone a surface treatment, a metal sheet D (80 mm×10 mm, a thickness: 4.0 mm, density: 2.63 g/cm$^3$, thermal conductivity: 138 W/(m·K)) of an aluminum alloy A5052 whose surface was sufficiently polished with #4000 polishing paper was prepared and used as a test piece 6.

The test, piece 6 was evaluated in the same manner as in Example 1. Here, for evaluating the thickness of the roughened layer and the average depth of the depression portions, the thickness of the roughened layer and the average de the depression portions were determined by observing a section of the surface portion of the test piece 6 by using a scanning electron microscope.

A housing composed only of the metal member of the present comparative example was prepared by processing an aluminum alloy A5052 by a known processing method.

The metal sheet D had the following properties.
Ra: 0.5 μm.
Rz: 0.7 μm
Thickness of roughened layer: 0 μm
Average depth of depression portions: 0 μm.
Specific surface area: 50
Degree of glossiness: 260

Comparative Example 2

A test piece not including a metal member was prepared. Specifically, the thermosetting resin composition (P1) was heated, injected in a predetermined amount into a mold, and then cured by compression molding, thereby obtaining a test piece 7 composed only of a 80 mm×10 mm resin member having a thickness of 4.0 mm. The compression molding was performed under the conditions of an effective pressure of 20 MPa, a mold temperature of 175° C., and a curing time of 3 minutes.

The test piece 7 was evaluated in the same manner as in Example 1.

Comparative Example 3

A metal-resin composite 6 was prepared by the same method as in Example 1, except that, instead of the metal sheet 1, the metal sheet A used in Example 1 that had not undergone a surface treatment was used. The metal-resin composite 6 was used as a test piece 8 and evaluated in the same manner as in Example 1.

The metal sheet A had the following properties.
Ra: 0.5 μm
Rz: 0.7 μm
Thickness of roughened layer: 0 μm
Average depth of depression portions: 0 μm
Specific surface area: 50

Degree of glossiness: 260

The conditions described above and evaluation results are shown in Tables 1 and 2. Here, regarding Comparative Example 1, those described as properties of the composite member are evaluation results obtained from the test piece 6 which does not include a resin member and is composed only of a metal member. Furthermore, regarding Comparative Example 2, those described as properties of a composite member are evaluation results obtained from the test piece 7 which does not include a metal member and is composed only of a resin member.

It is understood that, even if the evaluation described above is performed regarding a resin member, a metal member, and a metal-resin composite member by using a test piece cut off from the housing prepared in Example 1, the same evaluation results as obtained from the test piece 1 are obtained. Furthermore, it is understood that, even if a test piece cut off from the housing has a shape different from the shape of the test piece 1, the same evaluation results are obtained if the results are converted as necessary by the respective methods described in the above embodiment. The same is applied to Examples 2 to 5 and Comparative Examples 1 to 3.

TABLE 1

|  |  | Example 1 | Example 2 | Example 3 | Example 4 | Example 5 | Comparative Example 1 | Comparative Example 2 | Comparative Example 3 |
|---|---|---|---|---|---|---|---|---|---|
| Thermosetting resin (A) | Novolac-type phenolic resin | 34.3 | 10.7 | 34.0 | 34.3 | 34.3 | — | 34.3 | 34.3 |
|  | Resol-type phenolic resin | — | 25.3 | — | — | — | — | — | — |
| Filler (B) | Glass fiber | 57.1 | 53.5 | — | 57.1 | 57.1 | — | 57.1 | 57.1 |
|  | Clay | — | 4.9 | — | — | — | — | — | — |
|  | Graphite | — | — | 21.0 | — | — | — | — | — |
|  | Carbon fiber | — | — | 30.0 | — | — | — | — | — |
| Silane coupling agent (C) | Γ-Aminopropyl-triethoxysilane | 0.2 | 0.5 | — | 0.2 | 0.2 | — | 0.2 | 0.2 |
| Curing agent | hexa-methylenetetramine | 6.0 | — | 6.0 | 6.0 | 6.0 | — | 6.0 | 6.0 |
| Auxiliary curing agent | Slaked lime | — | 1.8 | — | — | — | — | — | — |
|  | Magnesium oxide | 0.5 | — | 1.5 | 0.5 | 0.5 | — | 0.5 | 0.5 |
| Others | Lubricant and the like | 1.9 | 3.3 | 7.5 | 1.9 | 1.9 | — | 1.9 | 1.9 |
|  | Material of metal member | A5052 | A5052 | A5052 | ADC12 | SUS304 | A5052 | — | A5052 |
|  | Whether or not roughening treatment is performed | Performed | Performed | Performed | Performed | Performed | Not performed | — | Not performed |

TABLE 2

|  |  | Example 1 | Example 2 | Example 3 | Example 4 | Example 5 | Comparative Example 1 | Comparative Example 2 | Comparative Example 3 |
|---|---|---|---|---|---|---|---|---|---|
| Resin member | Melt viscosity (Pa·s) | 425 | 435 | 430 | 425 | 425 | — | 425 | 425 |
|  | Thermal conductivity (W/(m·K)) | 0.4 | 0.4 | 0.4 | 0.4 | 0.4 | — | 0.4 | 0.4 |
|  | Density (g/cm³) | 1.78 | 1.79 | 1.46 | 1.78 | 1.78 | — | 1.78 | 1.78 |
| Metal member | Surface roughness Ra (μm) | 4.0 | 4.0 | 4.0 | 5.0 | 3.0 | 0.5 | — | 0.5 |
|  | Surface roughness Rz (μm) | 15.5 | 15.5 | 15.5 | 16 | 15 | 0.7 | — | 0.7 |
|  | Thickness of roughened layer (μm) | 15 | 15 | 15 | 20 | 15 | 0 | — | 0 |
|  | Average depth of depression portions (μm) | 13 | 13 | 13 | 17 | 13 | 0 | — | 0 |
|  | Specific surface area (—) | 270 | 270 | 270 | 280 | 270 | 50 | — | 50 |
|  | Degree of glossiness (—) | 10 | 10 | 10 | 8 | 10 | 260 | — | 260 |
| Metal-resin composite | 1,000,000-time bending fatigue resistance | ○ | ○ | ○ | ○ | ○ | ○ | x | x |
|  | Bending strength (MPa) | 273 | 270 | 239 | 351 | 368 | 411 | 139 | 80 |
|  | Impermeability of refrigerant | ○ | ○ | ○ | ○ | ○ | ○ | x | ○ |

TABLE 2-continued

|  |  | Example 1 | Example 2 | Example 3 | Example 4 | Example 5 | Comparative Example 1 | Comparative Example 2 | Comparative Example 3 |
|---|---|---|---|---|---|---|---|---|---|
| Housing | Performance of compressor | ○ | ○ | ○ | ○ | ○ | ○ | x | ○ |
|  | durability | ○ | ○ | ○ | ○ | ○ | ○ | — | Δ |

In the evaluation of compressor performance using the prepared housing, room temperature was lowered to the set value within 30 minutes in Examples 1 to 5 and Comparative Examples 1 and 3, and the performance of the compressor could be confirmed. In contrast, in Comparative Example 2, the temperature was not lowered to the set value even after the compressor was driven for 1 hour. In Comparative Example 2, the refrigerant permeated the housing when being compressed, and it is considered that the compressor could not function because the refrigerant was not sealed in the compressor.

As a result of the evaluation of durability of the housing of the compressor, in Examples 1 to 5 and Comparative Example 1, damage was not observed. In contrast, in Comparative Example 3, peeling of the metal member from the resin member was observed. The durability was not evaluated in Comparative Example 2. From these results, high durability could be confirmed in Examples 1 to 5.

Because the housings of Examples 1 to 5 were composed of a metal-resin composite, the weight thereof could be further reduced compared to the weight of housing composed only of the same type of metal.

It was confirmed that the metal-resin composites 1 to 5 obtained in Examples 1 to 5 have bending fatigue resistance (1,000,000-time bending fatigue resistance) by which peeling and fracture do not occur even if a pulsating three-point bending stress of 140 MPa was repeatedly applied thereto 1,000,000 times at 25° C. Therefore, in the housings of the compressors of Example 1 to 5, the performances such as lightweight properties and high resistance were well balanced.

In contrast, in Comparative Example 1, although the performance of the compressor and the durability of the housing were excellent, the housing was heavy. In Comparative Example 2, although the lightweight properties were excellent, the compressor could not demonstrate its performance. In Comparative Example 3, although the housing was lightweight, the durability thereof was poor. That is, all of Comparative Examples 1 to 3 were problematic in terms of the balance between performances such as lightweight properties and high durability.

The present application claims priority based on Japanese Patent Application No. 2014-084325 filed on Apr. 16, 2014, the entire disclosure of which is incorporated herein.

The invention claimed is:

1. A compressor housing composed of a metal-resin composite in which a resin member composed of a thermosetting resin composition and a metal member are bonded to each other, the compressor housing comprising:
at least one compression chamber that compresses a gas aspirated into the inside thereof,
wherein in a case where the metal-resin composite is made into a test piece in which the resin member having a thickness $d_1$ and the metal member having a thickness $d_2$ are laminated on and bonded to each other and a ratio of $d_1/d_2$ is 3, and the test piece is put in a first state where the test piece is disposed, the surface on the resin member-exposed side up, on two supports with no stress applied thereto and a second state where a 1-point bending stress of 140 MPa is applied in a thickness direction to the center of the surface on the resin member side such that the center caves in after the first state, when putting in the first and second states is alternately repeated 1,000,000 times at a frequency of 30 Hz under a temperature condition of 25° C. the metal-resin composite exhibits bending fatigue resistance in which neither peeling nor fracture occurs.

2. The compressor housing according to claim 1,
wherein the metal resin composite has a bending strength of equal to or greater than 150 MPa measured by bending the test piece, in which the resin member and the metal member are laminated on and bonded to each other and the ratio of $d_1/d_2$ is 3, based on JIS K 7171 such that the surface on the resin member side caves in.

3. The compressor housing according to claim 1,
wherein the resin member is exposed as an inner wall of the compression chamber.

4. The compressor housing according to claim 1,
wherein the metal-resin composite is obtained by bonding the metal member and the resin member to each other, and
at least a surface of the metal member that is bonded to the resin member has a degree of glossiness of equal to or greater than 0.1 and equal to or less than 30 measured at an incidence angle of 60° and a reflection angle of 60° based on ASTM-D523.

5. The compressor housing according to claim 1,
wherein the metal member has a plurality of depression portions within a bonding surface bonded to the resin member, and
each of the depression portions has such a sectional shape that, between an opening portion and a bottom portion of each of the depression portions, there is at least a portion whose section width is greater than a section width of the opening portion.

6. The compressor housing according to claim 5,
wherein a roughened layer provided with the plurality of depression portions is formed on the bonding surface of the metal member, and
a thickness of the roughened layer is equal to or greater than 3 μm and equal to or less than 40 μm.

7. The compressor housing according to claim 1,
wherein the metal-resin composite is obtained fry bonding the metal member and the resin member to each other, and
a ratio of an actual surface area, which is measured by a nitrogen adsorption BET method, of a surface of the metal member bonded to at least the resin member to an apparent surface area of the surface is equal to or greater than 100 and equal to or less than 400.

8. The compressor housing according to claim 1,
wherein a density of the resin member is equal to or less than 2.5 g/cm$^3$.

9. The compressor housing according to claim 1, wherein a thermal conductivity of the resin member measured by a laser flash method is equal to or less than 90 W/(m·K).

10. The compressor housing according to claim 1, wherein the resin member contains a phenolic resin.

11. A compressor comprising the compressor housing according to claim 1.

12. The compressor according to claim 11, further comprising a piston that compresses a gas aspirated into the compression chamber,
wherein within the inner wall of the compression chamber, at least a portion on which the piston slides is composed of the resin member.

13. A method for manufacturing a compressor housing, comprising:
a step of preparing a metal member and a mold;
a step of disposing the metal member in a molding space of the mold,
a step of filling the molding space with a fluidized resin material containing a thermosetting resin; and
a step of obtaining a housing composed of a metal-resin composite in which a resin member and the metal member are bonded to each other by curing the resin material filling the molding space, in this order,
wherein in a case where the metal-resin composite is made into a test piece in which the resin member having a thickness $d_1$ and the metal member having a thickness $d_2$ are laminated on and bonded to each other and a ratio of $d_1/d_2$ is 3, and the test piece is put in a first state where the test piece is disposed, the surface on the resin member-exposed side up, on two supports with no stress applied thereto and a second state where a 1-point bending stress of 140 MPa is applied in a thickness direction to the center of the surface on the resin member side such that the center caves in alter the first state, when putting in the first and second states is alternately repeated 1,000,000 times at a frequency of 30 Hz under a temperature condition of 25° C., the metal-resin composite exhibits bending fatigue resistance in which neither peeling nor fracture occurs.

14. The method for manufacturing a compressor housing according to claim 13,
wherein in the step of preparing a metal member and a mold, the metal member is prepared in which at least a region, which will be bonded to the resin member, within the surface of the metal member has undergone a roughening treatment.

15. The method for manufacturing a compressor housing according to claim 13,
wherein in the step of filing, the molding space is filled with the resin material while the metal member is being pressed on a molding surface of the mold by a flow pressure of the resin material.

* * * * *